(12) United States Patent
Dagalakis et al.

(10) Patent No.: US 6,484,602 B1
(45) Date of Patent: Nov. 26, 2002

(54) SIX-DEGREE OF FREEDOM MICRO-POSITIONER

(75) Inventors: Nicholas G. Dagalakis, Potomac, MD (US); Edward G. Amatucci, Mount Airy, MD (US)

(73) Assignee: National Institute of Standards and Technology, Gaithersburg, MD (US)

( * ) Notice: Subject to any disclaimer, the term of this patent is extended or adjusted under 35 U.S.C. 154(b) by 0 days.

(21) Appl. No.: 09/597,242

(22) Filed: Jun. 20, 2000

Related U.S. Application Data
(60) Provisional application No. 60/147,400, filed on Aug. 6, 1999, provisional application No. 60/140,066, filed on Jun. 21, 1999, and provisional application No. 60/180,966, filed on Feb. 8, 2000.

(51) Int. Cl.[7] .............................................. G05B 11/00
(52) U.S. Cl. ................... 74/490.08; 74/490.01; 901/19
(58) Field of Search ..................... 74/490.02, 490.01, 74/490.03, 490.08, 490.05, 490.06, 490.07; 901/15, 19, 22, 23, 49, 50

(56) References Cited

U.S. PATENT DOCUMENTS

| | | | | |
|---|---|---|---|---|
| 5,179,525 A | * | 1/1993 | Griffis et al. | ................ 364/512 |
| 5,832,783 A | * | 11/1998 | Sheldon | .................... 74/490.03 |
| 5,987,726 A | * | 11/1999 | Akeel | ................... 74/490.05 X |
| 6,240,799 B1 | * | 6/2001 | Yau | ........................... 74/490.03 |

* cited by examiner

*Primary Examiner*—Saul Rodriguez
(74) *Attorney, Agent, or Firm*—Antonelli, Terry Stout & Kraus LLP

(57) ABSTRACT

A positioning device is provided. The positioning device includes a movable platform and a monolithic base. Struts are attached to both the movable platform and the monolithic base. The monolithic base moves each of the attached struts to cause the movable platform to move.

17 Claims, 23 Drawing Sheets

SIX-DEGREE OF FREEDOM MICRO-POSITIONER

This application claims the benefit of provisional application No. 60/180,966 filed Feb. 8, 2000, No. 60/147,400 filed Aug. 6, 1999 and No. 60/140,066 filed Jun. 21, 1999.

TECHNICAL FIELD

The present invention relates to positioners for positioning objects, and more particularly to a deformable positioning stage.

BACKGROUND ART

Assembly of optic-electronic devices requires precision alignment of optical fibers with lasers or sensors and then bonding. A worker looking through a microscope at the end of a fiber conventionally executes this precision alignment and bonding process.

The alignment and bonding process can take as little as five minutes. However, if there is a misalignment of the fiber ends, this process can take as long as forty-five minutes to an hour. Misalignment often occurs because the fibers are subject to other than pure linear movement during the alignment process. Accordingly, a need exists for an improved alignment process which will reduce, if not eliminate, misalignment of a fiber end.

It is likely that in the next ten years the use of opto-electronic devices will spread to automobiles and every phone and computer manufactured in the United States, resulting in an estimated volume of 25 million units produced per year. Conventional assembly of opto-electronic devices can, as discussed above, require substantial worker time and therefore be quite costly. Accordingly, a need exists for a way to assemble opto-electronic devices which would require less worker effort and hence reduce the cost of assembly.

In other fields, delicate precision micrometer, sub-micrometer and nanometer assembly or positioning is also required. Such fields include medicine, biotechnology and electronic manufacturing. For example, individual atoms, molecules or nano-particles may be combined or separated to build materials and devices exhibiting desirable properties. Positioning devices currently available do not provide the precision and range of motion required in these and other technological fields. Accordingly, an improved technique is required for performing precision movement, often referred to as fine movement, at each of the micrometer, sub-micrometer and nanometer levels.

A planar biaxial micropositioning stage, which includes a deformable structure micro-positioning stage and which utilizes two nested cantilever flexure mechanisms facilitating movement of the stage in each of the X and Y axes has been proposed for use in precision manufacturing. A force can be applied to the proposed structure by an actuator to move the stage along the intended axis of movement. The actuator placement in this positioner is perpendicular to the axis of movement of the stage. However, the resulting movement in each of the X and Y directions is not purely linear. Rather, the proposed structure introduces a yaw which is unacceptable for precision manufacturing applications. This yaw is often referred to as a rotational cross talk error.

Known prior art positioning devices can not eliminate rotational cross talk unless additional actuators are included in the device to apply counterbalancing rotation and thereby ensure pure linear movement. These actuators add undesirable complexity and costs to the devices. Additionally, complex control algorithms must be developed and used to operate multiple actuators in concert to compensate for the cross talk.

In the proposed micro-positioning stage discussed above, as well as other proposed stages, the rotational cross talk error is inherent in the design. That is, applying a force intended to move a stage in one direction necessarily produces an unintended rotation. Accordingly, a need exists for a micro-positioner which does not impart rotational cross talk error into intended linear movement.

Control of conventional micro-positioners is performed through the use of feedback loops. At least one sensor is required to measure movement of a stage. Conventional deformable structure micro-positioners use sensors which are typically located at a position which results in inaccurate measurement of the true stage displacement. This inaccuracy due to sensor placement is commonly referred to as Abbe effect. Accordingly, a positioner is required which provides more accurate sensing.

Conventional deformable structure micro-positioners require that the actuator used to impart a force upon a movable stage be attached to the movable stage with an epoxy compound, or some other adhesive. These attachments impart a loss of force into the system. For example, when a force is applied to an epoxy connection between the actuator and the moving stage, the epoxy compresses, resulting in up to a 60 percent loss in applied force. Hence, an improved technique is required to attach an actuator to a movable stage to reduce the loss of force.

Using an epoxy or screws for the coupling, it is also difficult to obtain a pure parallel alignment of the actuator and the moving stage. Unparallel alignment results in a loss of force in the system. Furthermore, misalignment between the components may produce damaging stresses on the actuator. Accordingly, an improved coupling is required to achieve a parallel attachment between the coupling and an actuator.

Epoxy couplings are also subject to maintenance difficulties and durability limits. To remove an actuator from a deformable structure micro-positioner with epoxy couplings, the epoxy coupling must be cut using a machine tool. The two surfaces exposed by the cutting must be cleaned before they are reattached. This cutting and cleaning process may damage both the actuator and the deformable structure micro-positioner. Accordingly, a need exists for an improved technique of attaching and removing an actuator from a micro-positioner which eliminates the potentially damaging cutting and cleaning process.

Conventional deformable structure micro-positioners can be subjected to forces which may damage the individual components of a positioner. These forces may include inadvertent contact with the movable stage portion of the positioner or over-actuation of a drive used to move the movable stage. Accordingly, a need exists for a deformable structure micro-positioner which can better withstand damaging forces.

Deformable structure micro-positioners with one and two-degrees of freedom are well known. Six-degree of freedom positioners in the macro-scale are common. One type of six-degree of freedom positioner is often referred to as a Stewart platform. One familiar use of Stewart platforms is in aircraft simulators. However, a practical adaptation of macro-scale Stewart platforms to the micro-scale using a deformable structure platform has not been previously achieved.

A Stewart platform utilizes six struts to support a platform. Historically, macro-scale Stewart platform devices place drives, e.g. actuators, in each of the struts to obtain movement of the platform. In the proposed micro-scale adaptations of Stewart platforms, actuators are also placed in the struts. However, actuators of the type typically used in micro-scale positioners do not have the required range of motion necessary for use in the struts of a micro-scale adapted Stewart platform. Hence, more expensive and much larger actuators must be used in the proposed micro-scale Stewart platforms.

The February 1994 issue of NASA Tech Briefs proposed a positioner, characterized as a minimanipulator, with six-degrees of freedom. The drives which produce movement of the platform include stepping motors and rotary actuators. Each of these drives are subject to stiction and backlash. Hence, this manipulator is not capable of achieving fine movement, since none of the actuator configurations usable in this device can produce movement without some stiction and/or backlash. Accordingly, a need exists for an improved six-degree of freedom positioner which is capable of providing fine movement in each of the six degrees of freedom.

The conventional process for manufacturing deformable structure micro-positioning devices is costly and time-consuming. Typically, each device must be individually machined from a separate piece of material. Additionally, six-degree of freedom micro-positioners require separate manufacturing and assembly steps for each of the individual positioners. Accordingly, a need exists for a manufacturing process to produce a plurality of deformable structure micro-positioning devices, including six-degree of freedom devices, which is less costly and time-consuming.

OBJECTIVES OF THE INVENTION

One object of the present invention is to provide an improved technique for fine precision object manipulation in manufacturing and assembly processes.

Another object of the present invention is to provide a micro-positioning stage with precision movement on at least one of the micrometer, sub-micrometer and nanometer levels.

Another object of the present invention is to provide a micro-positioning stage with pure linear movement along an intended linear axis of movement.

Another object of the present invention is to provide a six-degree of freedom positioning stage with precision movement on at least one of the micrometer, sub-micrometer and nanometer levels.

Additional objects, advantages, and novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

In accordance with the present invention, a positioning device is provided. The positioning device may be used to position many different types and sizes of objects. These objects can range from large objects, which are commonly referred to as macro-scale objects, to very small objects, which are often referred to as micro-scale objects. Some objects in the micro-scale are measured in micro-meters. However, smaller objects in the micro-scale are measured in sub-micrometers. And, extremely small objects in the micro-scale are measured in nanometers. Objects at the nano-level are smaller than those measured in sub-microns. Objects in this smallest scale can include individual atoms.

The device includes a movable platform where objects to be positioned are placed for positioning. A plurality of struts are attached to the movable platform and to a monolithic base. Each strut, sometimes referred to as an extension, is attached at one end to the movable platform, and at its other end to the monolithic base.

The monolithic base is formed of a single piece, e.g. a block, of material which moves each of the struts independently, which in turn move the movable platform.

Beneficially, each of the struts can be attached to the monolithic base by a respective flexure. Each of the struts may, if desired, also be attached to the movable platform by a respective flexure. Advantageously, the plurality of struts is a total of six struts. The six struts are beneficially attached symmetrically about the movable platform. That is, the points at which the struts are attached to the movable platform are disposed equal distances from one another on the movable platform.

In accordance with other aspects of the invention, at least one sensor senses movement of the movable platform, and/or a stop member limits movement of the movable platform.

In a particularly advantageous implementation of the invention, the monolithic base includes three positioning stages. Preferably, the stages are machined into the base by removing material from the base.

Each of the three positioning stages has a portion, preferably an equal portion, of the plurality of struts attached to it. That is, the ends of each respective portion of the struts are attached to an associated one of the positioning stages, preferably at the center of the positioning stage. The portion of the struts attached to a positioning stage moves as a result of movement of that positioning stage. The movable platform moves as a result of movement of one or more of the positioning stages. Thus, the movable platform is moved by moving one, two, or all three of the positioning stages.

Beneficially, each of the three positioning stages moves in two orthogonal directions. If desired, each of the three positioning stages can be positioned independent of the positioning of any of the other positioning stages.

BRIEF DESCRIPTION OF DRAWINGS

In order to facilitate a fuller understanding of the present invention, reference is now made to the appended drawings. These drawings should not be construed as limiting the present invention, but are intended to be exemplary only.

BEST MODE FOR CARRYING OUT THE INVENTION

Preferred Embodiments

Figure 1:
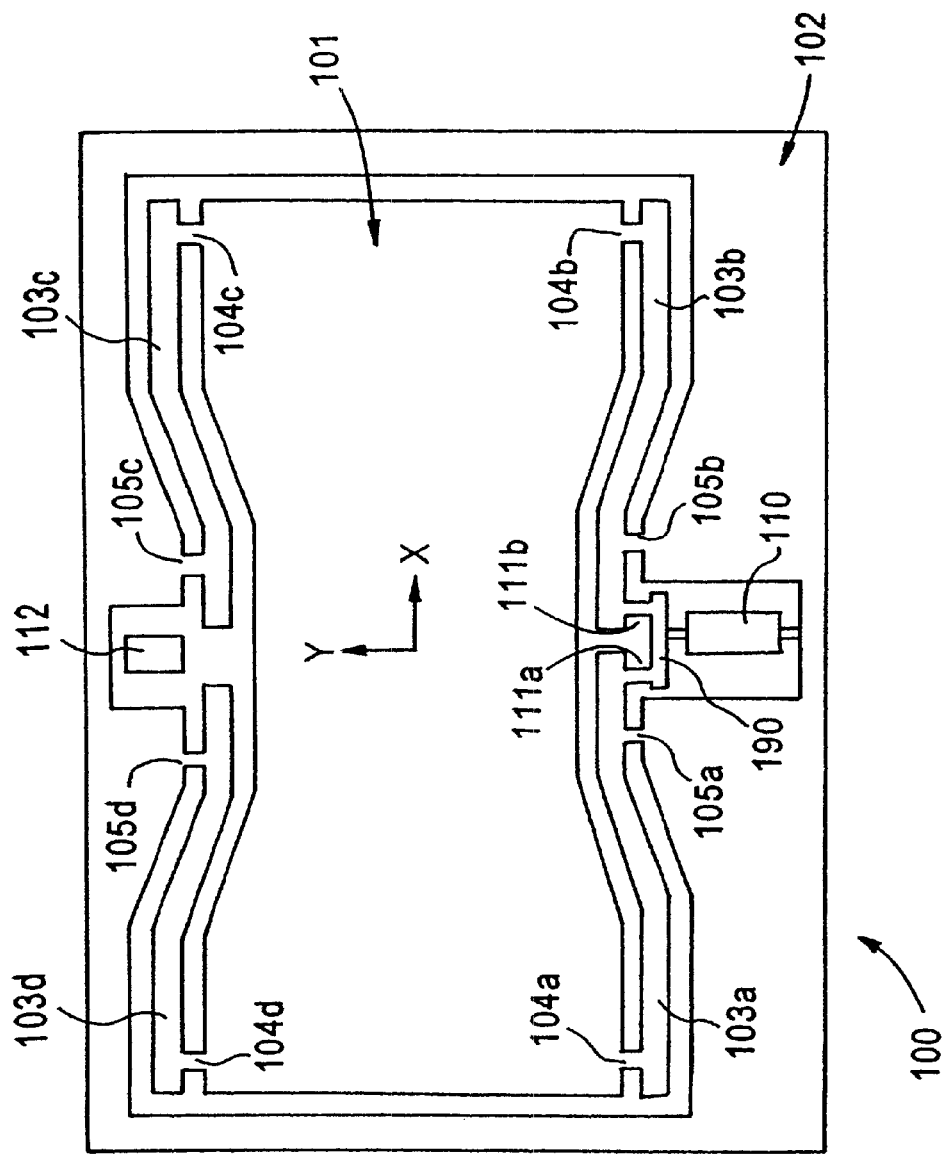
FIG. 1 shows a one-degree of freedom micro-positioner in accordance with the present invention.

One-Degree of Freedom embodiment:

FIG. 1 depicts a view of a high performance, low fabrication cost deformable structure parallel cantilever biaxial micro-positioning stage 100 in accordance with one aspect of the present invention. The deformable structure micro-positioner includes a moving stage 101 formed within and planar to a support structure 102. The moving stage is connected to the support structure via four levers 103a, 103b, 103c and 103d. Lever 103a is attached to the moving stage via flexure 104a and to the support structure via flexure 105a. Lever 103b is attached to the moving stage via flexure 104b and to the support structure via flexure 105b. Lever 103c is attached to the moving stage via flexure 104c and to the support structure via flexure 105c. Lever 103d is attached to the moving stage via flexure 104d and to the support structure via flexure 105d.

The four levers are bi-axially symmetrical. Lever pair 103a and 103d is symmetrical to lever pair 103b and 103c with respect to the Y-axis of the moving stage. Levers 103a and 103b are in-line. Levers 103c and 103d are also in-line. Lever pair 103a and 103b is symmetrical to lever pair 103d and 103c with respect to the X-axis of the moving stage.

The attaching flexures are also bi-axially symmetrical. Flexure 104a is symmetrical to flexure 104d with respect to the X-axis of the moving stage. Likewise, flexures 105a and 105d are symmetrical with respect to this axis. Flexures 105b and 105c are also symmetrical with respect this axis. Flexures 104b and 104c are also symmetrical to this X-axis. Flexure pairs 104a and 104b, 105a and 105b, 104d and 104c, and 105d and 105c are symmetric with respect to the Y-axis of the moving stage.

Input force is generated for movement in the direction of the Y-axis of the moving stage by actuator 110. The actuator is placed such that actuator movement is along the path of movement of the moving stage. The actuator may be removably mounted within the deformable structure micro-positioner. Actuator 110 imparts a force upon input block 190.

The actuator force is transmitted to the moving stage from input block 190 through flexure 111a of lever 103a and through flexure 111b of lever 103b. Lever 103a pivots about flexure 105a in an arc, transmitting the actuator force to the moving stage through flexure 104a. Lever 103b pivots about flexure 105b in an arc, transmitting the actuator force to the moving stage through flexure 104b.

As a result of the stage's movement, lever 103d pivots about flexure 105d in an arc. Also, lever 103c pivots about flexure 105c in an arc.

The symmetry of these four levers and four attachments makes these arcs symmetrical with respect to the Y-axis of the moving stage, with the components of motion along the x-axis equal and opposite, resulting in the cancellation of motion along the X-axis. The result is pure motion in the Y-axis direction and the elimination of translational and angular cross-talk error.

Levers 103a and 103b act as cantilevers, modifying the input force generated by the actuator. Flexures 105a and 105b serve as the fulcrums of the cantilevers. For example, a 1 micrometer input displacement from the actuator can result in a displacement of 10 micrometers at flexures 104a and 104b.

The cantilever design compensates for the very small motion capabilities of the limited number of actuators available for use in deformable structure micro-positioning devices. The movement generated by the actuator is amplified mechanically to achieve the desired range of motion. The range of motion can be from nanometer movement to multiple micrometer movement.

A sensor 112 may be provided on-axis with the actuator and perpendicular to the moving stage to provide precision measurement and control of the moving stage. The on-axis design reduces Abbe offset error, thus obtaining precision measurement.

Preferably, a capacitance type gauge is employed as a sensor. The capacitance gauge monitors the output resulting from the actuator input multiplied by the leverage and minus losses in the system. A sensor is critical for feedback control, but may be omitted for open-loop applications in which calibration of the stage may be sufficient to characterize the stage motion, or when other types of feedback, such as vision, are used.

Figure 3:
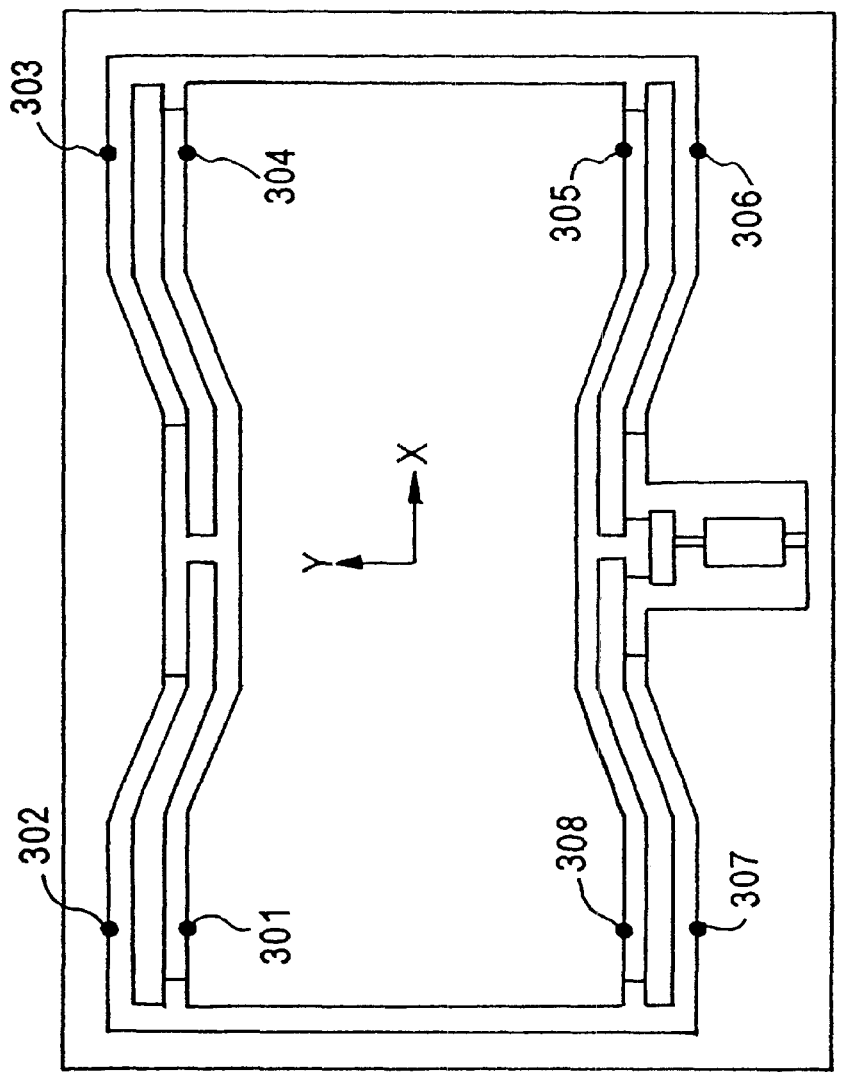
FIG. 3 shows a one-degree of freedom micro-positioner with safety stops in accordance with the present invention.
Figure 4:
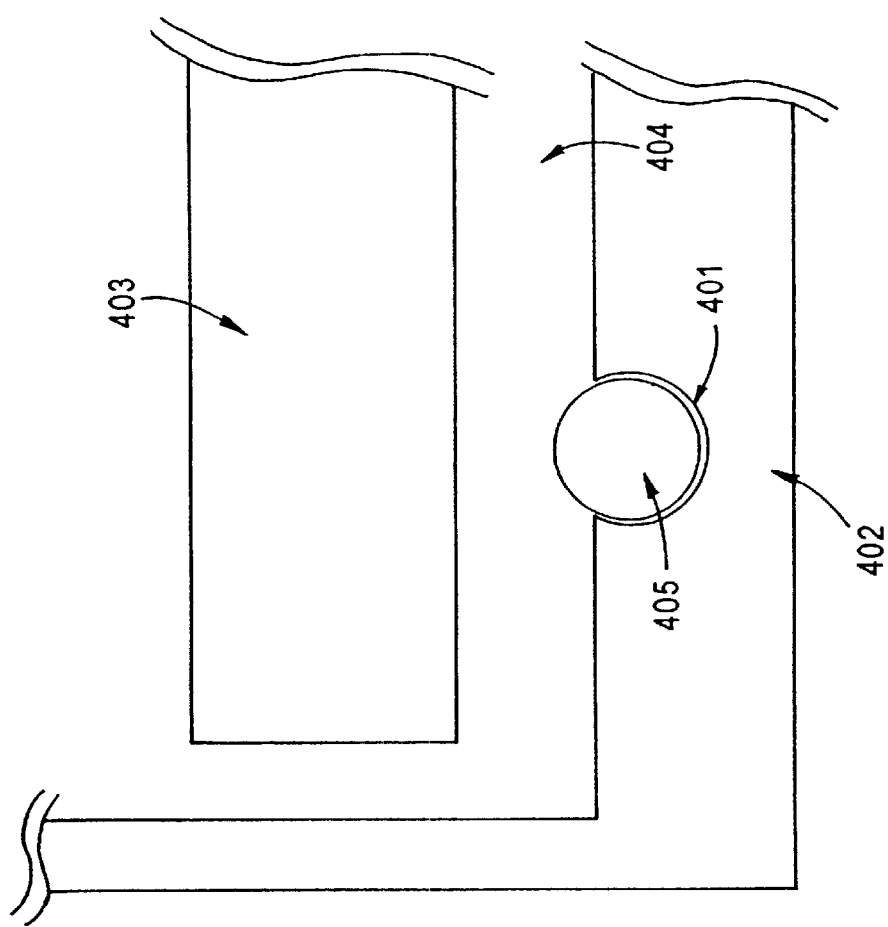
FIG. 4 shows a detail of a safety stop shown in FIG. 3.

FIG. 3 depicts a deformable structure micro-positioner with safety stops 301–308, any or all of which may be included in the deformable structure micro-positioner. Unlabeled components in FIG. 3 are identical to those in FIG. 1 as described above. Safety stops may be positioned on either side of each lever. FIG. 4 depicts a single safety stop, as shown in FIG. 3, embedded in the support structure 402. A partial hole 401 is formed into the support structure. A rod 405 is inserted into the hole. The rod extends into gap 404 between the lever 403 and the support structure. The rod prevents the lever from traveling the entire width of the gap. This prevents accidental damage to the actuator due to, for example, unintended contact between a robot and the moving stage. In case of accidental contact, only limited rotation about the flexure would occur before the lever contacts the safety stop. As should be understood, a safety stop positioned on the other side of a lever is also formed of a hole and a rod. The difference being, the hole is formed in the moving stage.

Figure 14:
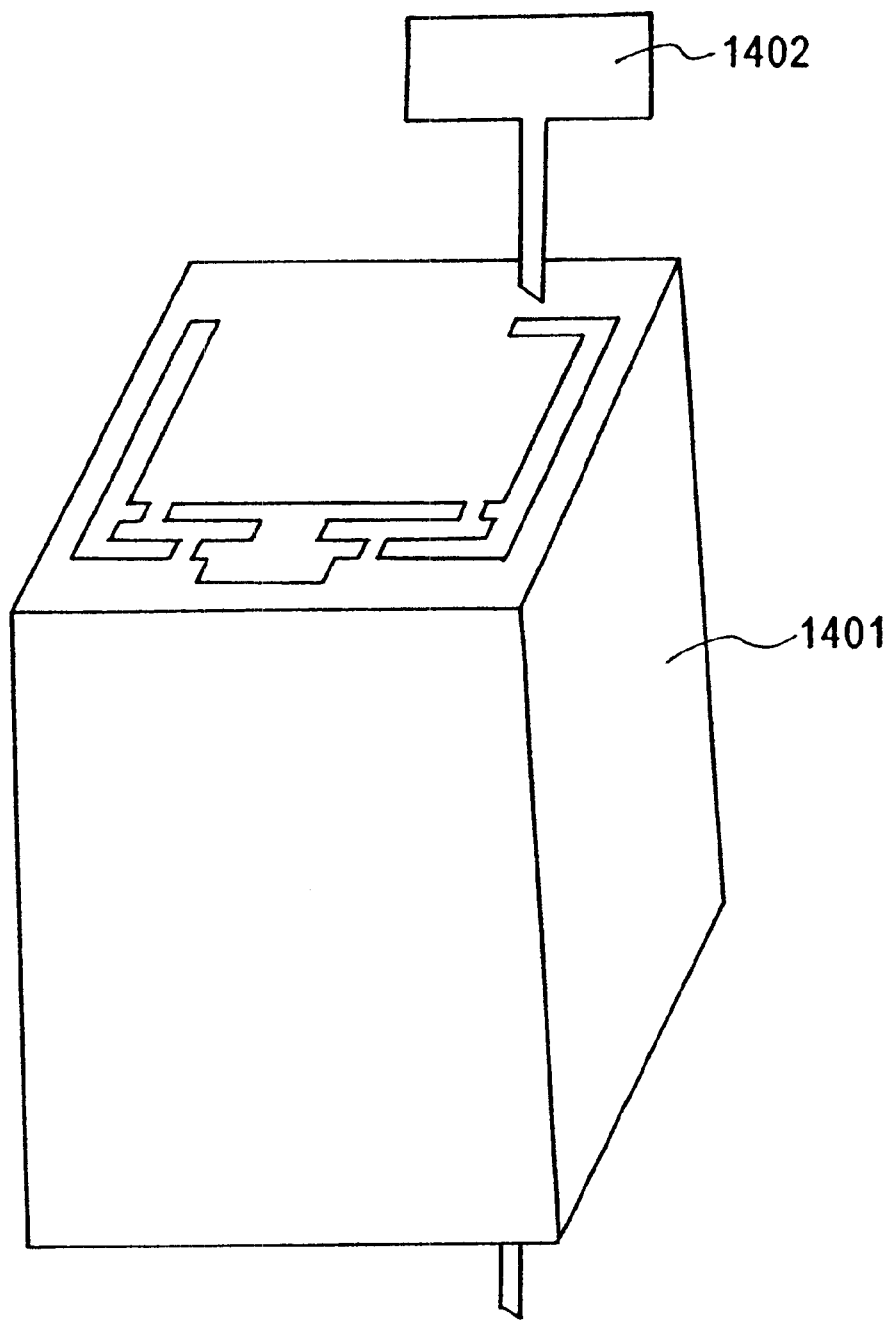
FIG. 14 shows a positioning device being machined into a single piece of material in accordance with the present invention.
Figure 15:
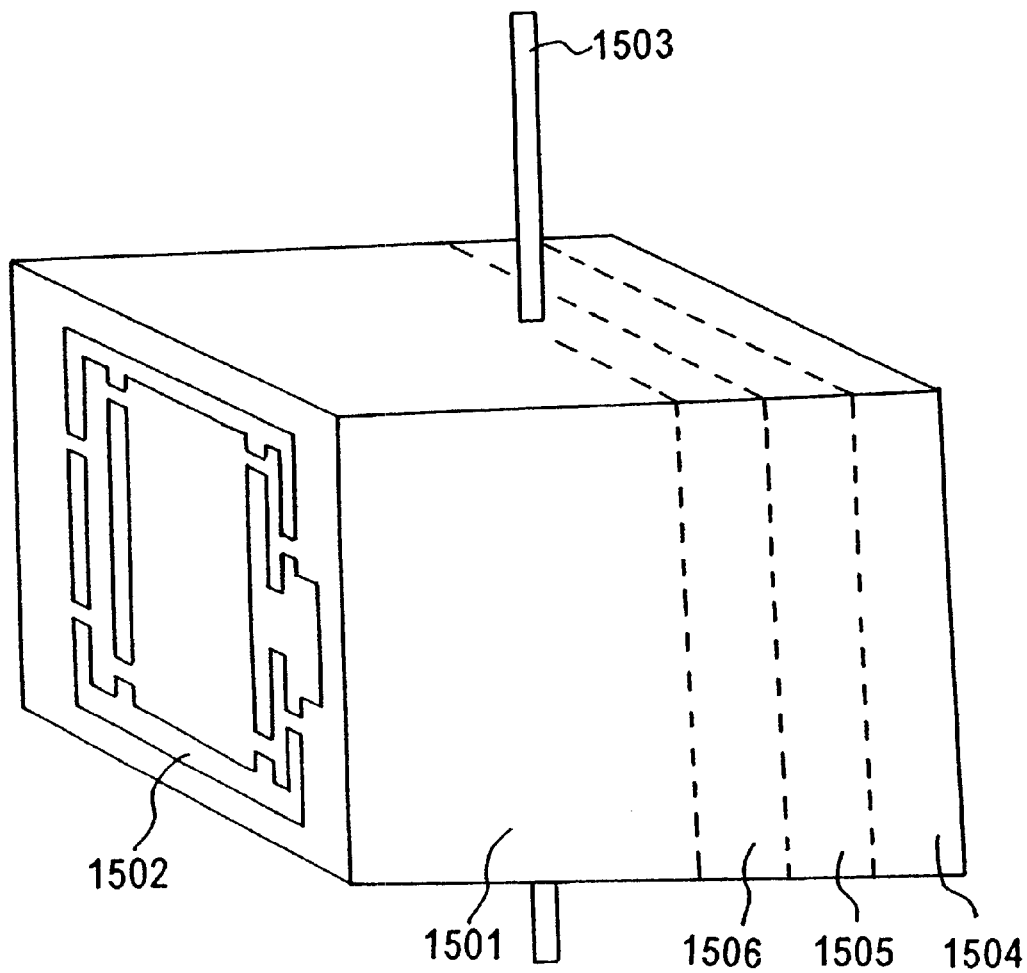
FIG. 15 shows a single piece of material with a positioning device machined into it being sliced into a plurality of positioning devices in accordance with the present invention.

The deformable structure micro-positioner of the present invention is monolithic. It is formed out of a single piece of material. The components of the positioner may be machined out of the material, which may include aluminum, other types of metals, or a silicon sheet. A single piece of material may be machined with the form of the micro-positioner. FIG. 14 shows a single piece of material 1401 and a machining device 1402. The machining device may be an electric discharge machining (EDM) device. This single piece can then be sliced to produce several deformable structure micro-positioners out of the single piece of material and a single machining. FIG. 15 shows a single piece of material 1501 with the components of a positioning stage machined into piece 1502. A slicing device 1503 is shown for slicing the piece into a plurality of positioning devices 1504 1505 1506. This reduces the cost of manufacture compared to some commercial micro-stages currently available for sale.

When manufacturing the deformable structure micro-positioner out of silicon, several can be stamped out at the same time, as in manufacturing semiconductors. A large number of these devices can be included on a single piece of silicon performing nano-assembly work.

The moving stage portion of the positioner may be machined or etched in a honeycomb pattern. This lightens the entire device, improving dynamics.

Because of the symmetry of the flexures being in the vertical, the deformable structure micro-positioner has the ability to support a larger payload than the vast majority of commercial deformable structure micro-positioners. This deformable structure micro-positioner can tolerate a larger amount of weight compared to other deformable structure micro-positioners.

Figure 2:
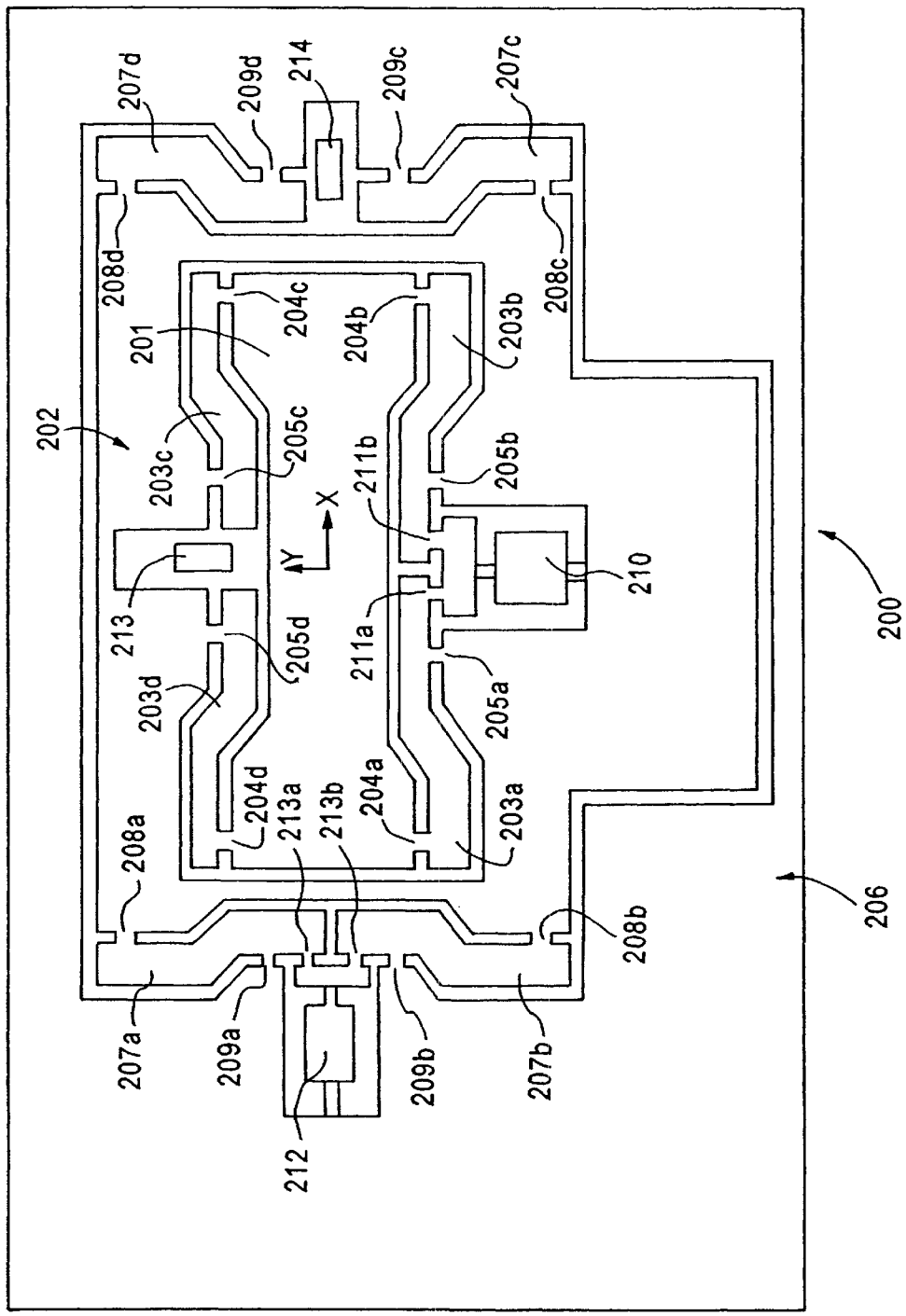
FIG. 2 shows a two-degree of freedom micro-positioner in accordance with the present invention.

Two-Degree of Freedom embodiment:

FIG. 2 depicts a view of a deformable structure micro-positioner 200 in accordance with another aspect of the present invention. The deformable structure micro-positioner of FIG. 2 provides pure linear motion in the direction of both the X and Y axes of the moving stage. Two-degrees of freedom are obtained by placing a first actuator/symmetrical lever-set within a second actuator/symmetrical lever-set. Both of these actuator/symmetrical lever-sets are borne of the same design as the actuator/symmetrical lever-set described above in the one-degree of freedom embodiment. The outer actuator/symmetrical lever-set is an enlarged and rotated 90 degrees version of the inner actuator/symmetrical lever-set. When the outer actuator/symmetrical lever-set is operated, the entire inner actuator/symmetrical lever-set moves as a result.

A moving stage 201 is connected to an inner support structure 202 via four levers 203a, 203b, 203c and 203d. Lever 203a is attached to the moving stage via flexure 204a and to the inner support structure via flexure 205a. Lever 203b is attached to the moving stage via flexure 204b and to the inner support structure via flexure 205b. Lever 203c is attached to the moving stage via flexure 204c and to the inner support structure via flexure 205c. Lever 203d is attached to the moving stage via flexure 204d and to the inner support structure via flexure 205d.

Lever pair 203a and 203d is symmetrical to lever pair 203b and 203c with respect to the Y-axis of the moving stage. Levers 203a and 203b are in-line. Levers 203c and 203d are also in-line. Lever pair 203a and 203b is symmetrical to lever pair 203d and 203c with respect to the X-axis of the moving stage.

Flexure 204a is symmetrical to flexure 204d with respect to the X-axis of the moving stage. Likewise, flexures 205a and 205d are symmetrical with respect to this X-axis. Flexures 205b and 205c are also symmetrical with respect to this X-axis. Flexures 204b and 204c are also symmetrical with respect to this X-axis. Flexure pairs 204a and 204b, 205a and 205b, 204d and 204c, and 205d and 205c are symmetric with respect to the Y-axis of the moving stage.

Input force is generated for movement in the direction of the Y-axis of the moving stage by actuator 210. The actuator is placed such that actuator movement is along the Y-axis of the moving stage. The actuator may be removably mounted within the deformable structure micro-positioner.

The actuator force is transmitted to the moving stage through flexure 211a of lever 203a and through flexure 211b of lever 203b. Lever 203a pivots about flexure 205a in an arc, transmitting the actuator force to the moving stage through flexure 204a. Lever 203b pivots about flexure 205b in an arc, transmitting the actuator force to the moving stage through flexure 204b.

As a result of the stage's movement, lever 203d pivots about flexure 205d in an arc. Also, lever 203c pivots about flexure 205c in an arc.

The symmetry of these four inner levers and four inner attachments makes the arcs symmetrical with respect to the Y-axis of the moving stage, with the components of motion along the X-axis equal and opposite, resulting in the cancellation of motion along the X-axis. The result is pure motion in the Y-axis direction and the elimination of translational and angular cross-talk error.

The inner support structure and moving stage are formed within an outer support structure 206. The inner support structure is connected to the outer support structure via four levers 207a, 207b, 207c and 207d. Lever 207a is attached to the inner support structure via flexure 208a and to the outer support structure via flexure 209a. Lever 207b is attached to the inner support structure via flexure 208b and to the outer support structure via flexure 209b. Lever 207c is attached to the inner support structure via flexure 208c and to the outer support structure via flexure 209c. Lever 207d is attached to the inner support structure via flexure 208d and to the outer support structure via flexure 209d.

Lever pair 207a and 207b is symmetrical to lever pair 207d and 207c with respect to the Y-axis of the moving stage. Levers 207a and 207b are in-line. Levers 207c and 207d are also in-line. Lever pair 207b and 207c is symmetrical to lever pair 207a and 207d with respect to the X-axis of the moving stage.

Flexure 208a is symmetrical to flexure 208b with respect to the X-axis of the moving stage. Likewise, flexure pairs 209a and 209b, 208c and 208d, and 209c and 209d are symmetrical with respect to this X-axis. Flexure pairs 208a and 208d, 208b and 208c, 209a and 209d, and 209b and 209c are symmetric with respect to the Y-axis of the moving stage.

Input force is generated for movement in the direction of the X-axis of the moving stage by actuator 212. The actuator is placed such that actuator movement is along the X-axis of the moving stage. This actuator may be removably mounted within the deformable structure micro-positioner.

Actuator force is transmitted to the moving stage through flexure 213a of lever 207a and through flexure 213b of lever 207b. Lever 207a pivots about flexure 209a in an arc, transmitting the actuator force to the inner support structure through flexure 208a. Lever 207b pivots about flexure 209b in an arc, transmitting the actuator force to the inner support structure through flexure 208b.

As a result of the inner support structure's movement, lever 207d pivots about flexure 209d in an arc. Also, lever 207c pivots about flexure 209c in an arc.

The symmetry of these four outer levers and four outer attachment points makes these arcs symmetrical with respect to the X-axis of the moving stage, with the components of motion along the Y-axis equal and opposite, resulting in the cancellation of motion along the Y-axis. The result is pure motion in the X-axis direction and the elimination of translational and angular cross-talk error.

As should be understood, like the one-degree of freedom embodiment, sensors may be included aligned with the actuators. Sensor 213 measures movement along the Y-axis of the moving stage. Sensor 214 measures movement along the X-axis of the moving stage.

Queensgate Instruments manufactures an X-Y deformable structure micro-positioning stage which introduces a rotational cross talk error into the intended linear movement. This deformable structure micro-positioning stage, marketed as NPS-XY-100A, has an error of 10 microradians, 0.573 mdegress, for a range of motion of 100 micrometers.

Physik Instrumente's P-762 XY nanopositioner also introduces a rotational cross talk error. For a range of motion of 100 micrometers, this stage also produces an error of 10 microradians, or 0.573 mdegrees.

The present invention has superior performance compared with these well respected devices. Performance measures indicate that the deformable structure micro-positioner of the present invention attains five times smaller rotational cross-talk error for the same range of motion of these devices.

Two Elcomat autocollimators with a true square are used to provide simultaneous measurement of pitch, roll and yaw of the two-degree of freedom deformable structure micro-positioner. Resolution of the Elcomat is at least 0.01 arc-second. Accuracy is limited to perhaps an order of magnitude worse if care is not taken to enclose the optical beam path within a tube and average at least 20 seconds of data for each data point. The metrology instrument used is an LVDT displacement sensor, which monitors the input displacement to the moving stage from one of the actuators.

By combining autocollimator measurements with moving stage displacement measurements, straightness of travel may be estimated by using a numerical integration algorithm. A LabView program controls movement of the moving stage through a serpentine pattern along a 10×10 matrix of positions. At each position, approximately 1000 autocollimator measurements are collected and averaged together. Test results show that the two-degree of freedom deformable structure micro-positioner has an angular error of 0.3 to 0.4 arcseconds, or 0.11 mdegrees. This performance is 5.21 times better than the performance of both the Queensgate and Physik Instrumente deformable structure micro-positioners.

Figure 5:
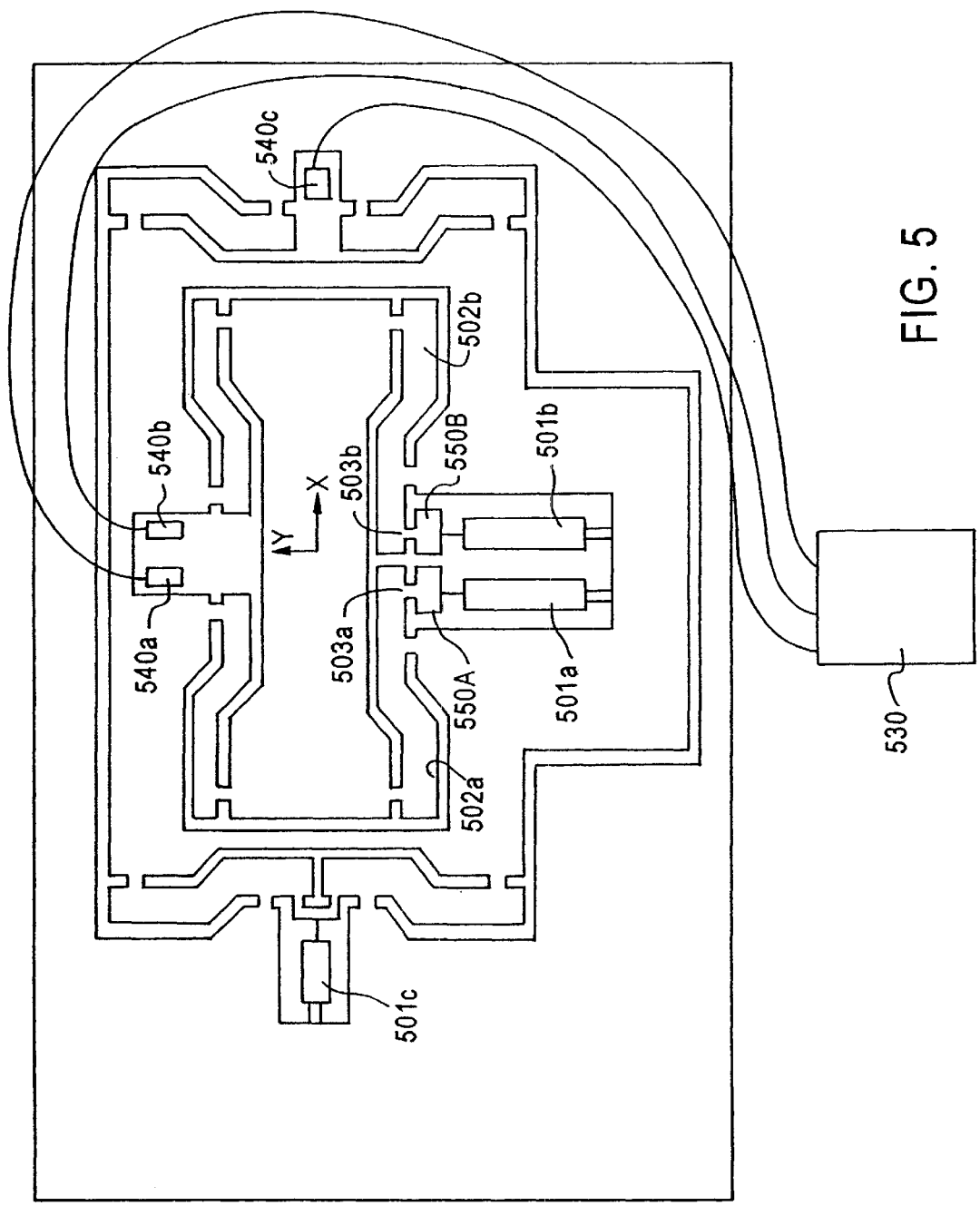
FIG. 5 shows a three-degree of freedom micro-positioner with three actuators in accordance with the present invention.

Three-Degree of Freedom embodiment:

FIG. 5 depicts a deformable structure micro-positioner with three degrees of freedom. Unlabeled components are identical to those in FIG. 2 and as described above. The moving stage may move in the direction of both the X and Y axes of the moving stage, in addition to in rotation. This rotational movement is achieved by the addition of an additional actuator along either of the X or the Y axis of the moving stage, for a total of three actuators, 501a, 501b, and 501c. For example, as depicted in FIG. 5, actuator 501c provides movement in the direction of the X-axis. Actuators 501a and 501b are both disposed parallel to the Y-axis of the moving stage and provide both a high level of rotation accuracy and pure linear movement in the direction of the Y-axis. To obtain movement in the X direction, the deformable structure micro-positioner operates in the same manner as described in the two-degree of freedom embodiment above and depicted in FIG. 2. To obtain linear movement in the direction of the Y-axis, actuators 501a and 501b operate together with equal force. To obtain rotational movement, only one of actuators 501a or 501b may be operated. Or, actuators 501a and 501b may both be operated to produce unequal forces.

Actuator 501a is connected to lever 502a via flexure 503a and input block 550a. Actuator 501b is connected to lever 502b via flexure 503b and input block 550b. For example, to produce a rotation in a counterclockwise direction, actuator 501a may be operated alone. Conversely, to produce a rotation in a clockwise direction, actuator 501b may be operated alone.

Actuators 501a and 501b may be operated together to impart both an axial movement and a rotation movement to the deformable structure micro-positioner. To achieve this movement, unequal forces are applied to levers 502a and 502b from the respective actuators.

Figure 16:
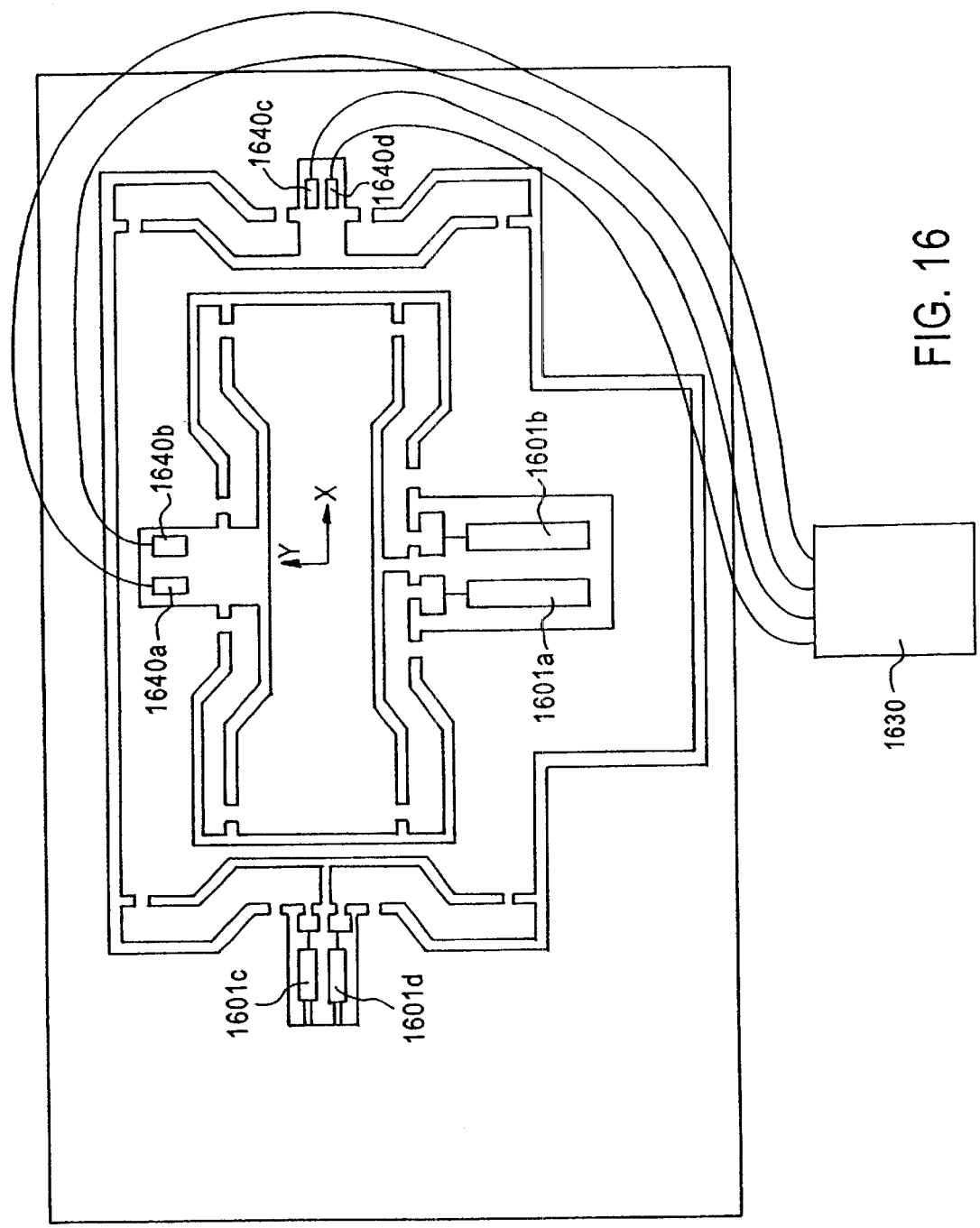
FIG. 16 shows a three-degree of freedom micro-positioner with four actuators in accordance with the present invention.

A fourth actuator may be added to the micro-positioner. FIG. 16 shows a three-degree of freedom positioner with four actuators, 1601a, 1601b, 1601c, 1601d. Unlabeled components are identical to those of FIG. 5 and as discussed above. Each axis of movement includes two actuators. This configuration allows a higher controllability of the deformable structure micro-positioner by adding the ability to control rotation on both sides of the moving stage. Additionally, the four-actuator design protects the components of the deformable structure micro-positioner. Rotation of the moving stage may strain the flexures, coupling and actuator on the side of the moving stage having only a single actuator. Four actuators maintain the symmetry of the deformable structure micro-positioner. Rotation of the moving stage will not introduce stresses into the device, as the rotation can be compensated by the quad actuator design.

For embodiments in which two actuators are included along a single Axis of movement, two sensors may be used to obtain precise measurements. Each sensor is placed, as with the single actuator/sensor configurations described above, along the line of force generated by the respective actuator. In FIG. 5, sensor 540a is aligned with actuator 501a. Sensor 540b is aligned with actuator 501b. Sensor 540c is aligned with actuator 501c. In FIG. 16, sensor 1640a is aligned with actuator 1601a. Sensor 1640b is aligned with actuator 1601b. Sensor 1640c is aligned with actuator 1601c. Sensor 1640d is aligned with actuator 1601d. Rotation of the moving stage is measured by taking the difference between the two measurements of the two sensors placed in a single direction of movement.

The sensors are connected to controller 530 and 1630. Output data from each sensor is input to the controller. This data may be processed by the controller, along with at least one input describing the desired movement of the moving stage, to control the force generated by each actuator to move the moving stage. It should be understood that the controller may be used with any of the embodiments described herein.

It should also be understood that the use of dual actuators to obtain rotational movement may be combined with the one-degree of freedom embodiment described above. This results in a moving stage movable along not only one axis, but also rotatable.

Figure 17:
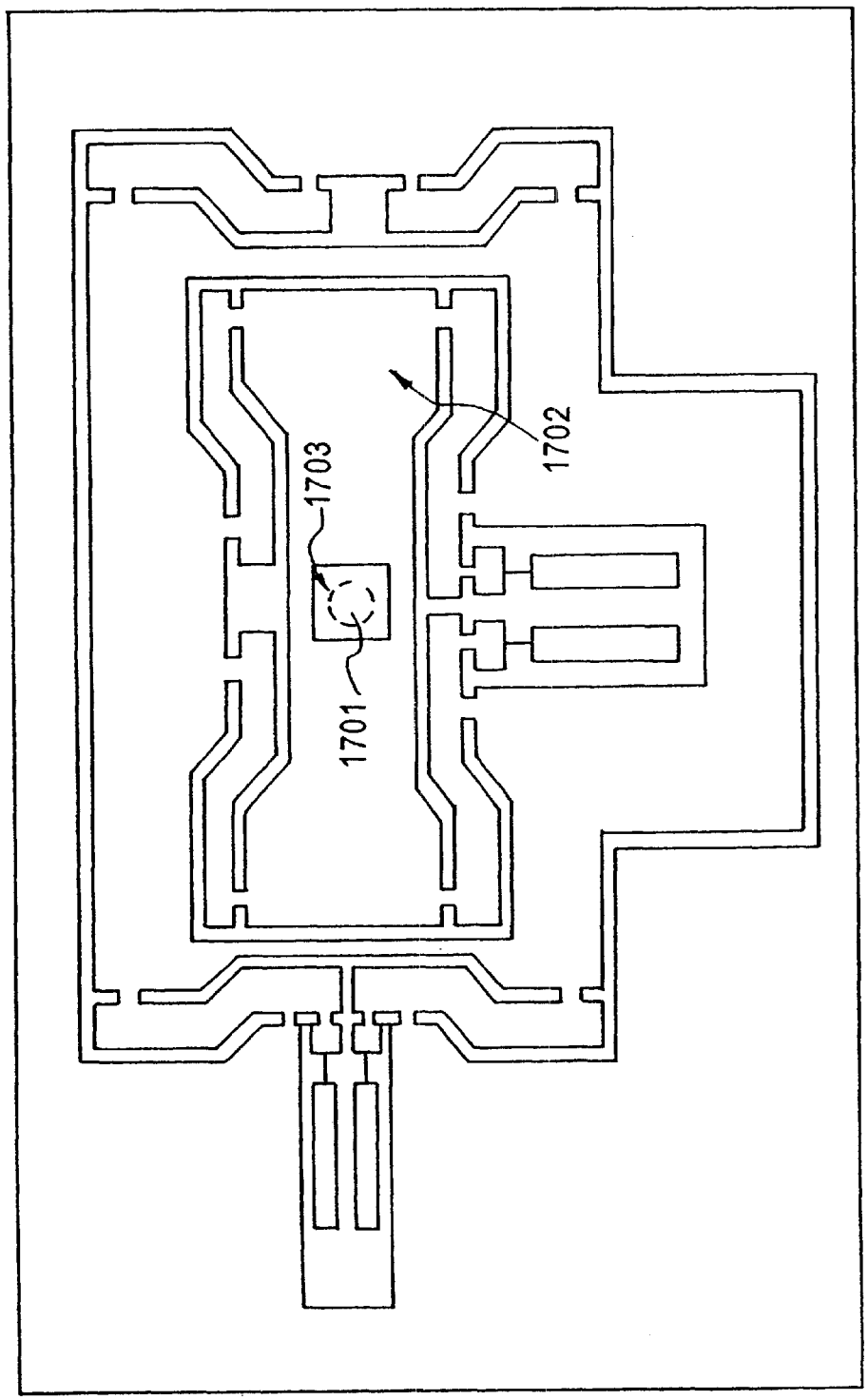
FIG. 17 shows a four-degree of freedom positioning device with four actuators in accordance with the present invention.

Four-Degrees of Freedom embodiment:

A fourth degree of freedom may be added to a three-degree of freedom deformable structure micro-positioner by including an actuator placed on the moving stage. This actuator raises and lowers an object placed upon the deformable structure micro-positioner. FIG. 17 shows a three-degree of freedom positioner with actuator 1701 placed upon the moving stage 1702 to obtain the fourth degree of freedom. Upper stage 1703 is placed on top of actuator 1701. Unlabeled components are identical to those depicted in FIG. 16 and described above.

Figure 6:
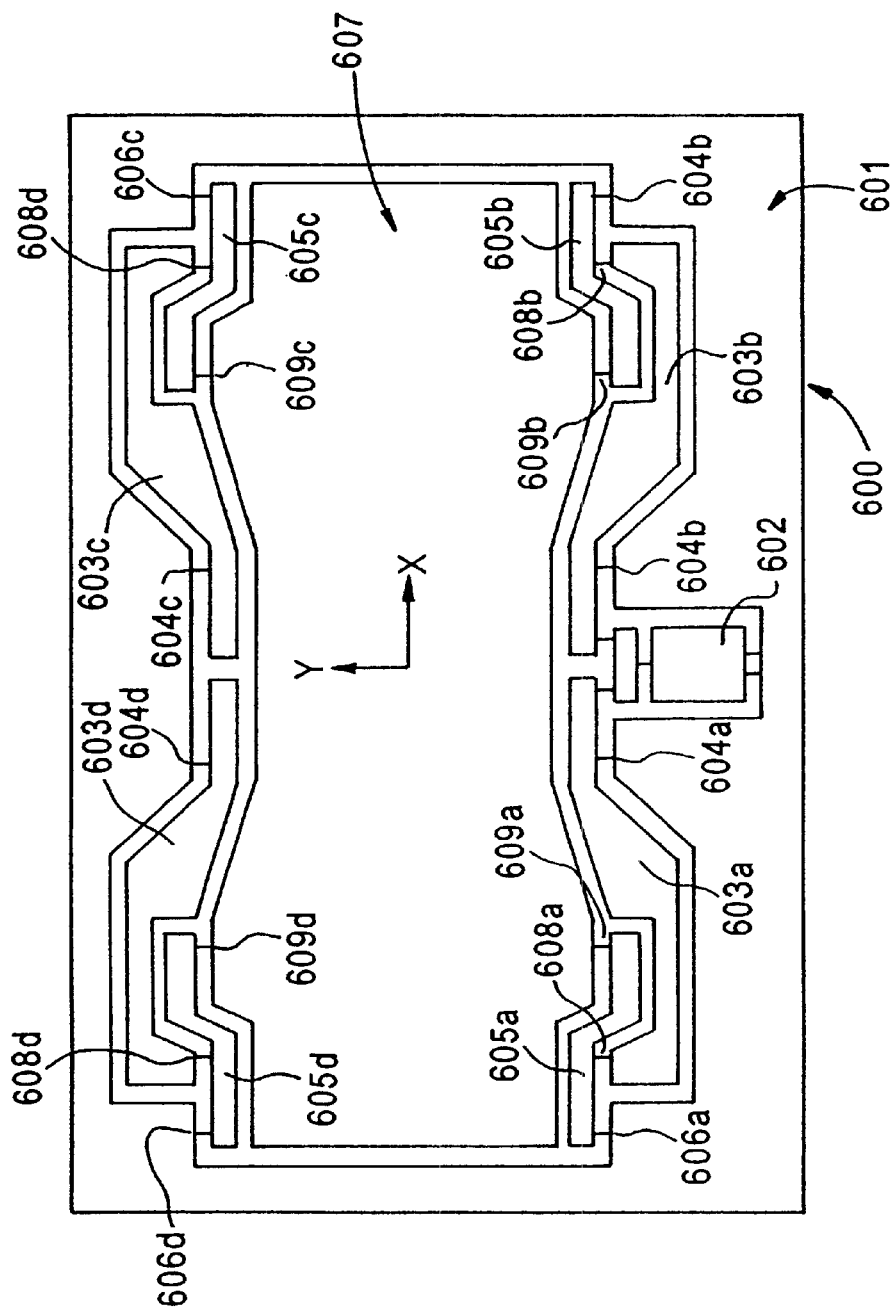
FIG. 6 shows a reduced size one-degree of freedom micro-positioner in accordance with the present invention.

Reduced Size embodiment:

The size of the above deformable structure parallel cantilever biaxial micro-positioning stages may be reduced as much as 60 percent. FIG. 6 depicts a reduced size embodiment 600. Shown is a one-degree of freedom device for movement in the direction of the Y-axis of the moving stage 607. As should be understood, the design may be expanded to achieve movement along the X-axis and to impart desired rotation to the moving stage. Also, two actuators may be used on any axis of movement. Unlabeled components are identical to those in FIG. 1.

The reduced size design maintains the symmetry of the previously described embodiments. Instead of four levers connecting the moving stage to the support structure 601, nested levers are used. Each of the four levers of the one-degree of freedom micro-positioner described above is replaced with two levers. Actuator 602 moves both levers 603a and 603b. Lever 603a pivots about flexure 604a. Lever 603b pivots about flexure 604b. In turn, lever 603a moves lever 605a through flexure 608a. Lever 605a pivots about flexure 606a. Also, lever 603b moves lever 605b through flexure 608b. Lever 605b pivots about flexure 606b. And finally, levers 605a and 605b move the moving stage through flexures 609a and 609b.

As should be understood, the levers on the opposite side of the moving stage from the actuator mirror the configuration of the above described nested levers, for a total of eight levers. The symmetry of the above described embodiments is maintained in the reduced size design. Thus, pure linear motion is maintained with the reduced size design.

The eight levers are bi-axially symmetrical. Lever pair 605a and 605d is symmetrical to lever pair 605b and 605c with respect to the Y-axis of the moving stage. Lever pair 603a and 603d is also symmetrical to lever pair 603b and 603c with respect to this axis. Levers 603a and 603b are in-line. Levers 605a and 605b are also in-line. As well, levers 603d and 603c are also in-line. And, levers 605d and 605c are in-line.

Lever pair 603a and 603b is symmetrical to lever pair 603d and 603c with respect to the X-axis of the moving stage. Also, lever pair 605a and 605b is symmetrical to lever pair 605d and 605c with respect to this axis.

As described above in the one-degree of freedom embodiment, the attaching flexures of the reduced size embodiment are also bi-axially symmetrical. Flexure 606a is symmetrical to flexure 606d with respect to the X-axis of the moving stage. Flexure 606b is symmetrical to flexure 606c with respect to this axis. Flexures 608a and 608d are symmetric about the X-axis. Flexures 608b and 608c are symmetric about the X-axis. Flexures 609a and 609d, as well as flexures 609b and 609c, are symmetric about the X-axis of the moving stage. And, as should be understood, flexures 604a and 604d, as well as flexures 604b and 604c, are symmetric about this axis. Flexure pairs 606a and 606b, 608a and 608b, 609a and 609b, 604a and 604b, 606d and 606c, 608d and 608c, 609d and 609c, and 604d and 604c are symmetric with respect to the Y-axis of the moving stage.

Figure 7:
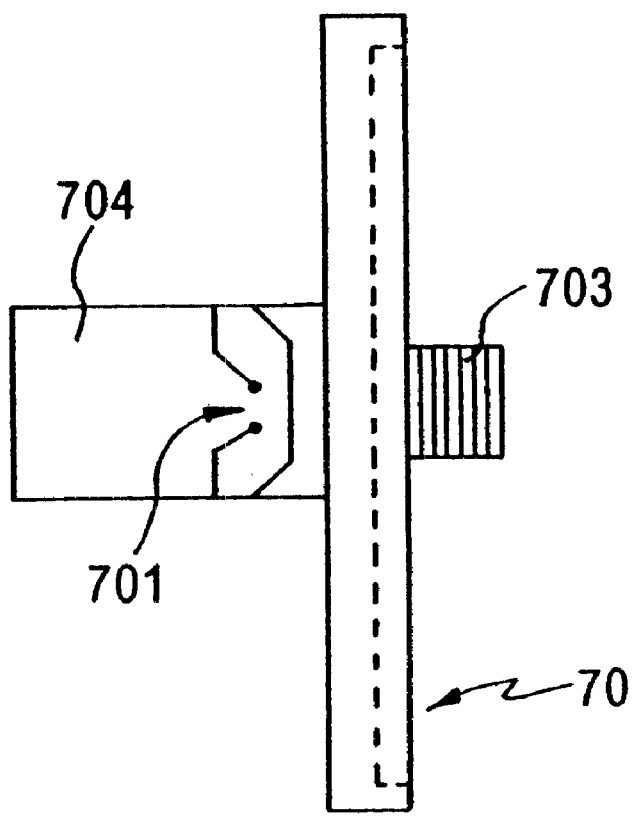
FIGS. 7 and 8 show a coupling used in any of the micro-positioners shown in FIGS. 1–6.
Figure 8:
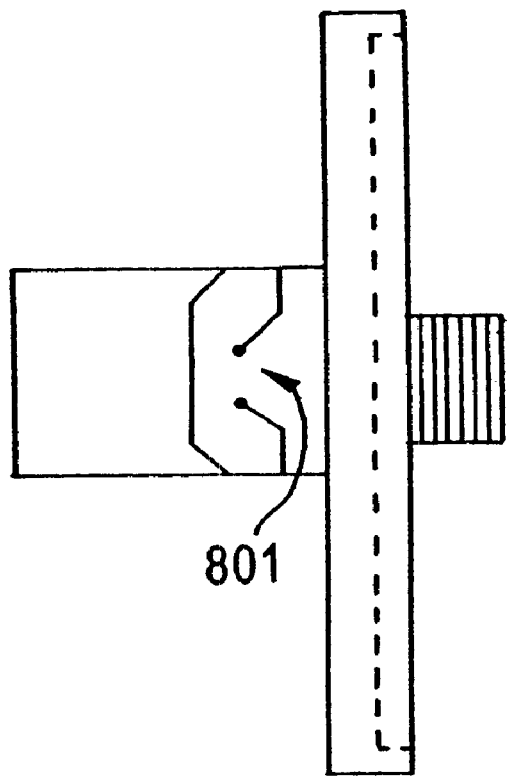

Universal Perpendicular Flexure Hinge Joint Coupling:

Forces generated by the actuator are transmitted to the moving stage through a universal perpendicular flexure hinge joint coupling depicted in FIGS. 7 and 8. FIG. 8 shows the coupling rotated ninety degrees from the depiction in FIG. 7. The coupling is designed to ensure transmission of only axial loads and to allow un-axial motion to deflect the flexure elements. The flexure coupling allows only very small non-axial displacements and provides a 75% efficiency in transmission of axial displacements from the actuator. The flexure disengages motion other than axial motion from the moving stage.

The universal perpendicular flexure hinge joint coupling includes two flexure hinge elements located on the same plane and orthogonal to each other. The flexures may be manufactured using electric discharge machining (EDM) technology by boring two set of holes 701 801 into a rod portion 704 of the coupling at a ninety degree angle from each other in a plane perpendicular to the axis of rotation of the coupling. The holes extend through the coupling perpendicular to the axis of rotation of the coupling.

A slot is cut at an angle away from and then up to the surface of the rod from each of the bored holes. The angle in each of the four slots reduces the length of the universal flexure joint along the length of the coupling. The two slots cut from holes 701 are mirror images of the two slots cut from holes 801. The result is two symmetric flexure hinges at right angles to each other created by the removed material. This allows a universal joint type operation and transmission of semi-pure axial loading for small mechanical displacements. The size of the bores and center placement of each bore from its paired bore can be optimized to achieve the required axial stiffness and lateral flexibility required for the coupling.

Traditional epoxy or screw couplings may introduce rotational cross talk error to movement of the deformable structure micro-positioner. When force is applied to the deformable structure micro-positioner which is not parallel to the intended axis of movement, the un-axial component of the force is transferred to the moving stage. This un-axial force may be generated by a misaligned actuator or uneven coupling. The universal flexure joint of the present invention absorbs these un-axial forces, and only transmits the axial forces.

Some actuators, like piezoelectric actuators, need to be protected from lateral load. This universal perpendicular flexure hinge joint coupling eliminates potential damage to the piezoelectric actuator by absorbing un-axial forces.

Figure 9:
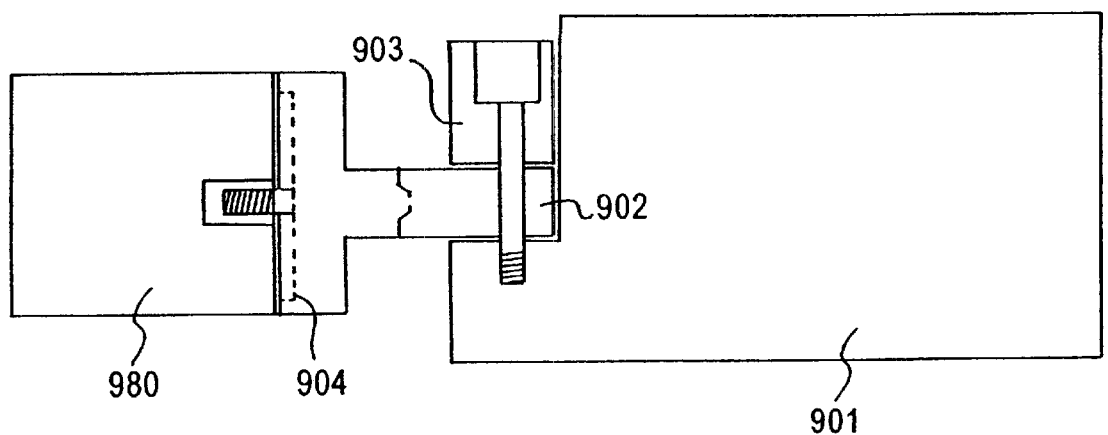
FIG. 9 shows a coupling installed in any of the micro-positioners shown in FIGS. 1–6.

FIG. 9 depicts a sectional view of the coupling mounted in the micro-positioner. The coupling is attached to an input block 901 formed in the deformable structure micro-positioner and to an actuator 980. The universal perpendicular flexure hinge joint coupling includes a circular rod extension 902. This extension fits into a V-groove cut into the input block. The extension rests in the V-groove along two lines of contact. A clamp 903 holds the extension in the V-groove, for a total of three lines of contact between the couplings and the input block and clamp, kinetically constraining the coupling. The clamp may be removably secured to the input block by the use of two screws.

Figure 10:
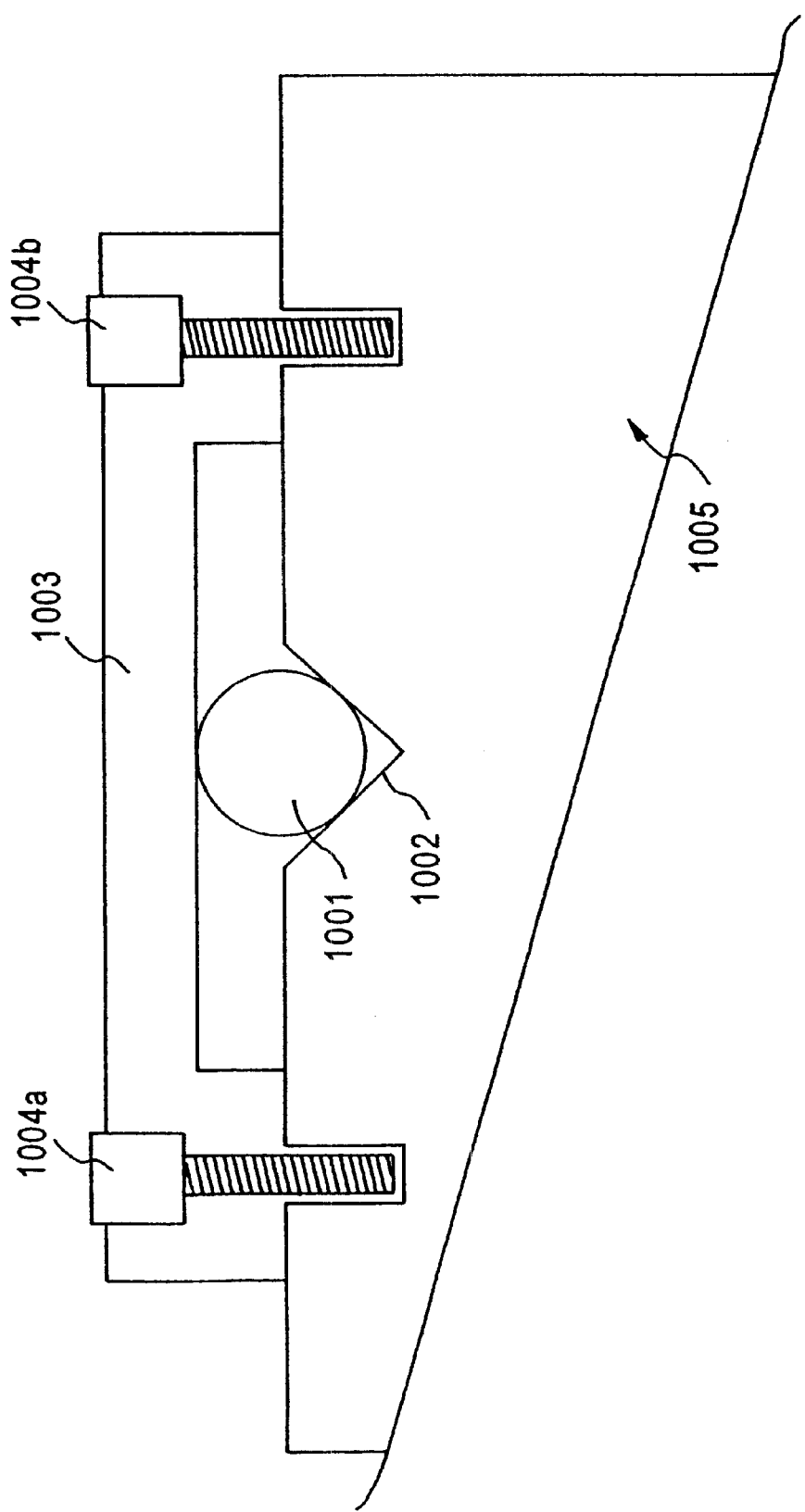
FIG. 10 shows a detail of a coupling attached to an input block of a micro-positioner as shown in FIG. 9.

FIG. 10 shows another view of the circular extension 1001 constrained in the V-groove 1002 cut into the input block 1005. Clamp 1003 is shown with two screws 1004a 1004b holding the circular extension in place.

This coupling includes a circular plate 702 with a outer raised edge 720 and threaded portion 703 for attachment to the actuator. The outer raised edge in combination with the threaded portion act together to provide a positive lock between the actuator and the coupling. The raised edge acts as a lock washer providing spring tension between the actuator and coupling. This configuration helps to eliminate backlash. The raised edge is also shown at 904.

Other advantages of this coupling compared to an epoxy or screw coupling is ease of assembly, reduction of lateral loads on an actuator, and a reduction in loss of force across the coupling. With flexure universal couplings in general, this mechanical configuration keeps the hinge points on the same plane with better strength. Other flexure universal couplings, like perpendicular plate hinges or spiral flexures, are weaker for the same level of axial loading performance.

Figure 11A:
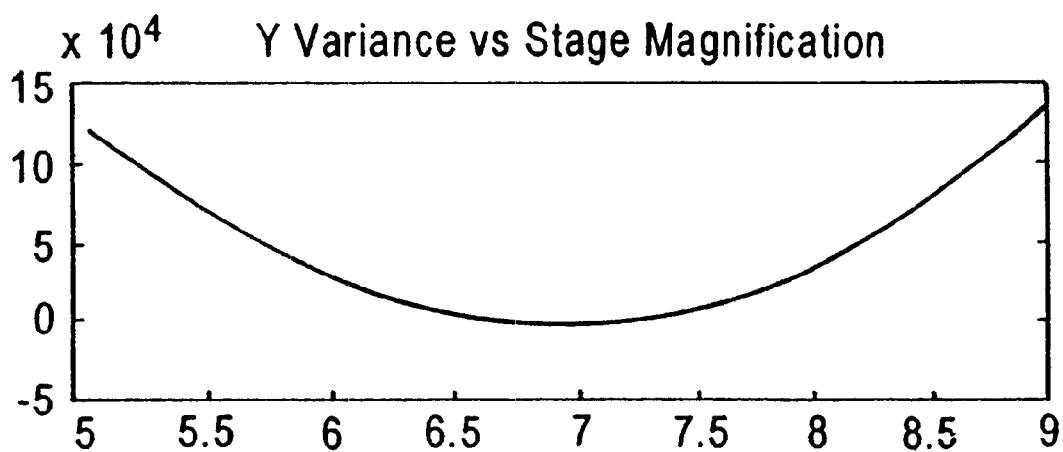
FIGS. 11A and 11B show performance measures of the coupling of FIGS. 7 and 8.
Figure 11B:
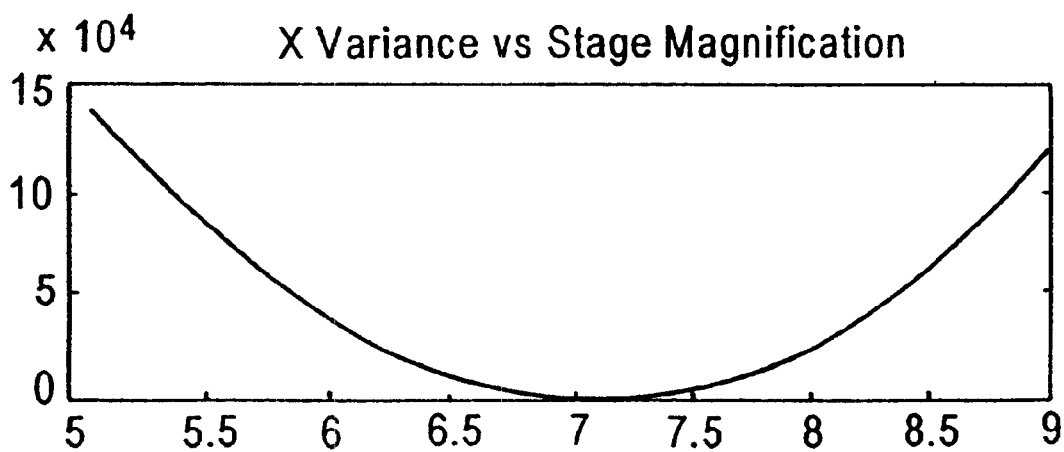

FIGS. 11a and 11b show performance measures of the universal perpendicular flexure joint coupling. To estimate actuator coupling efficiency, a least squares algorithm was written in MATLAB to fit the actual stage motions in the XY plane, as measured by capacitance gauges, to the expected stage motions. The expected stage motion is the actuator command displacement multiplied by the mechanical magnification factor designed into the flexural guiding mechanisms.

Providing performance measures and calibration methods for these coupling coefficients is of importance because open-loop performance of the stage is linked to the knowledge and stability of the actuator/payload mechanical linkages.

Actuator coupling linkages play a far more important role in predicting open-loop stage performance than the micro-positioner's mechanical leverage ratio. The couplings are subject to stress concentrations at the fasteners which will tend to relieve itself over time. The coupling should find a stable equilibrium, but only after a considerable number of thermal and vibration cycles are undertaken to relieve assembly stress.

FIGS. 11a and 11b show two dimensional least-squares fit of stage coupling coefficient showing approximately seventy percent mechanical transmission from the actuator to the payload.

Figure 12A:
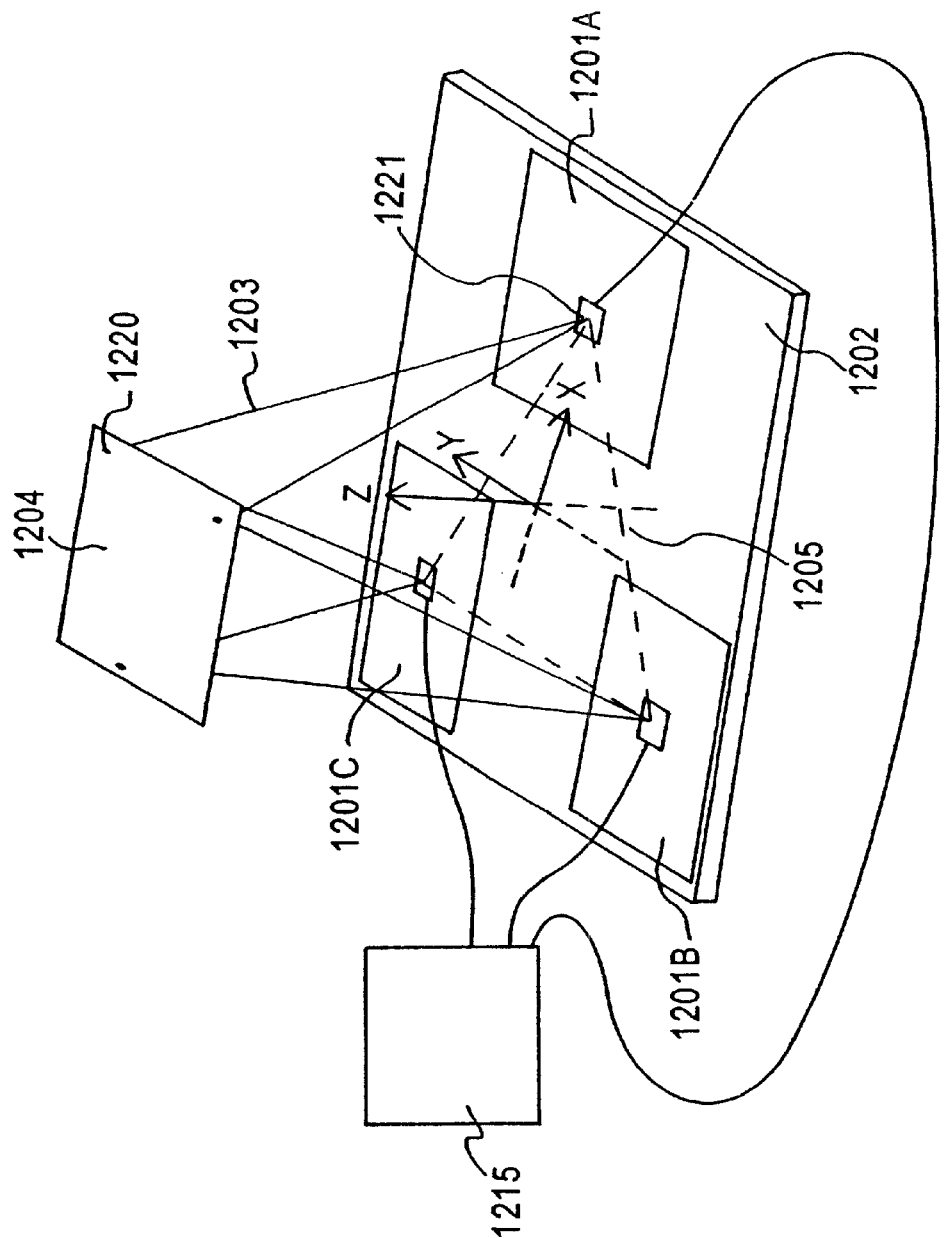
FIGS. 12A–12I show a six-degree of freedom deformable structure micro-positioner in accordance with the present invention in different positions.

Six-Degree of Freedom:

The superior performance of the above described deformable structure micro-positioner design can be extended into six-degrees of freedom. FIG. 12a depicts a six-degree of freedom deformable structure micro-positioner. This micro-positioner can generate high accuracy, small displacement, and high resolution motion. The moving platform 1204 has the ability to move in translation and rotation about three orthogonal axes.

Three two-degree of freedom deformable structure micro-positioners, as described above, 1201a, 1201b, and 1201c are formed into a monolithic base plate 1202. Attached at the center of each of the three moving stages are two struts 1203, for a total of six struts. Each of the six struts is attached to the moving platform 1204.

The coordinates of the attachment points of the struts to each of the three two-degree of freedom micro-positioners form the base of the device. FIG. 12a shows the six-degree of freedom micro-positioner in a baseline position. That is, none of the three two-degree of freedom micro-positioners are moved. Reference triangle 1205 is shown to facilitate understanding of movement of each of the three two-degree of freedom micro-positioners. In this baseline depiction, the center of each of the three two-degree of freedom micro-positioners is positioned at a respective one of the three points of the reference triangle. When the moving stage of each of the micro-positioners moves, the size and shape of the base changes, the struts deform and the position and orientation of the moving platform changes.

Using calibration and sensors, the position and orientation of the moving platform is controlled by commanding displacements of each of the three micro-positioners. A controller 1215 processes sensor measurements and input directions to control movement of the moving platform. Movement force generated off of the struts allows the struts to take on any length necessary.

Each of the six struts includes a coupling at either end 1220 1221, acting as universal joints to allow rotation and bending. The couplings may be flexures or any other coupling allowing the intended movement.

Figure 12B:
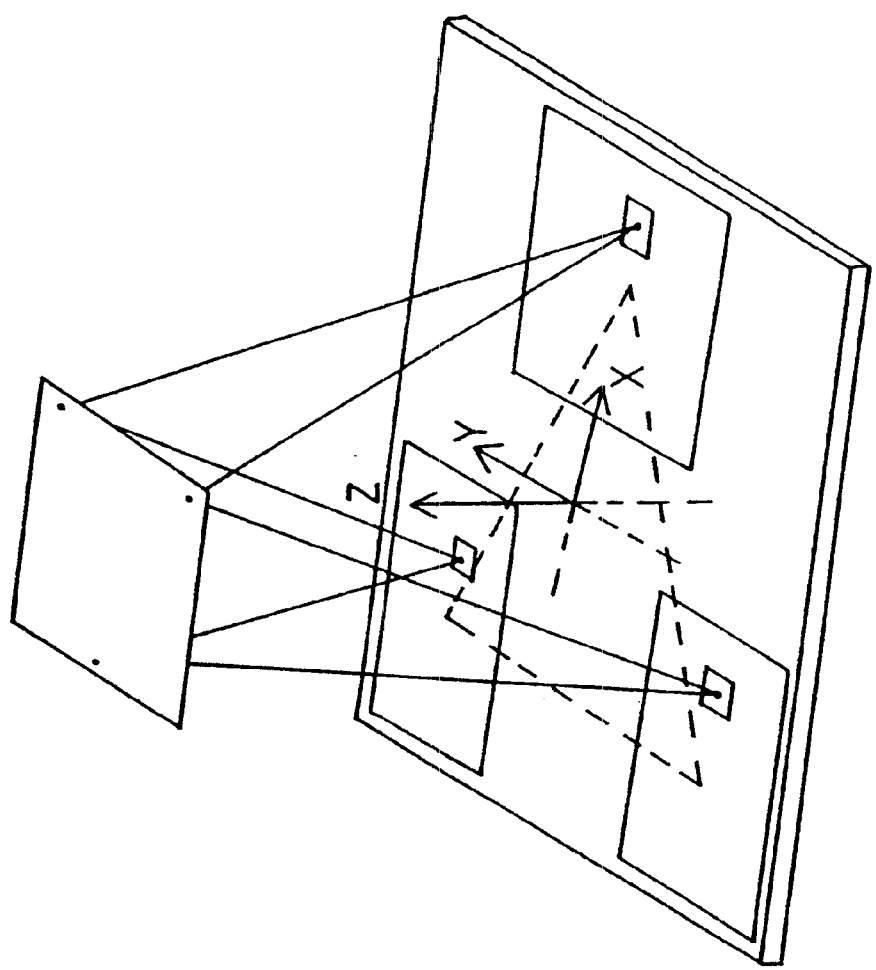

FIG. 12B shows the six-degree of freedom micro-positioner moved in pure translation along the X-axis. Unlabeled components are identical to those in FIG. 12A. Each of the three two-degree of freedom micro-positioners are moved in pure translation along the direction of the X-axis. The moving platform moves in pure translation in the direction of the X-axis as a result of movement of each of the two-degree of freedom micro-positioners. As shown, each of the three two-degree of freedom micro-positioners is the same distance from their respective point on the reference triangle in the direction of the X-axis.

Figure 12C:
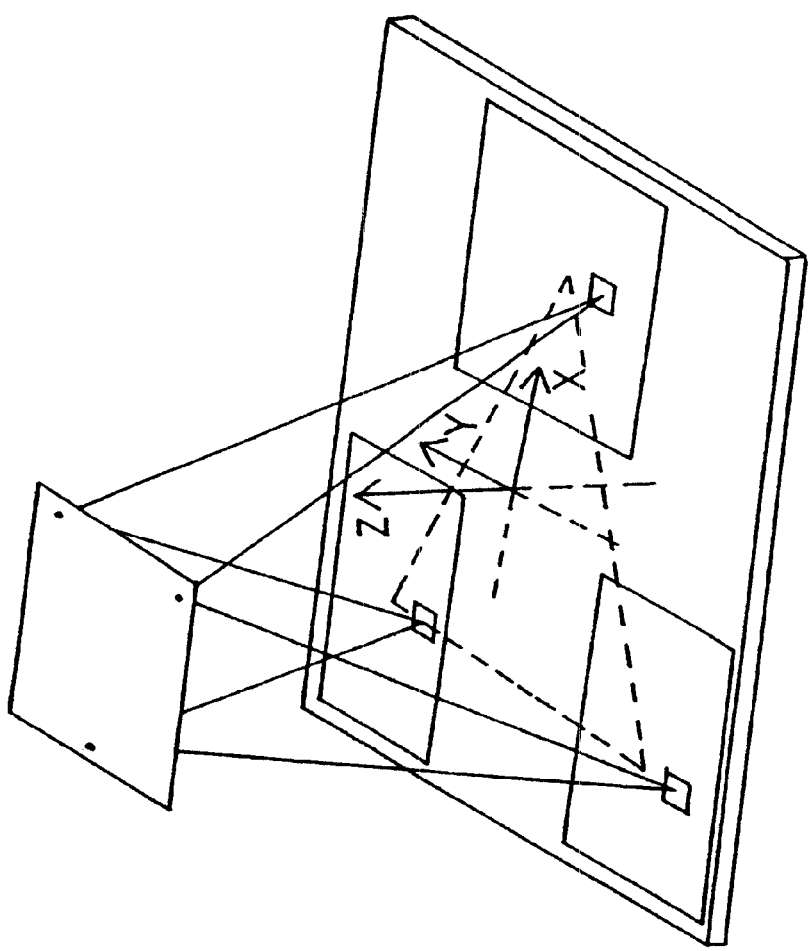

FIG. 12C shows the six-degree of freedom micro-positioner moved in pure translation along the Y-axis. Unlabeled components are identical to those in FIG. 12A. Each of the three two-degree of freedom micro-positioners are moved in pure translation along the direction of the Y-axis. The moving platform moves in pure translation in the direction of the Y-axis as a result of movement of each of the two-degree of freedom micro-positioners. As shown, each of the three two-degree of freedom micro-positioners is the same distance from their respective point on the reference triangle in the direction of the Y-axis.

Figure 12D:
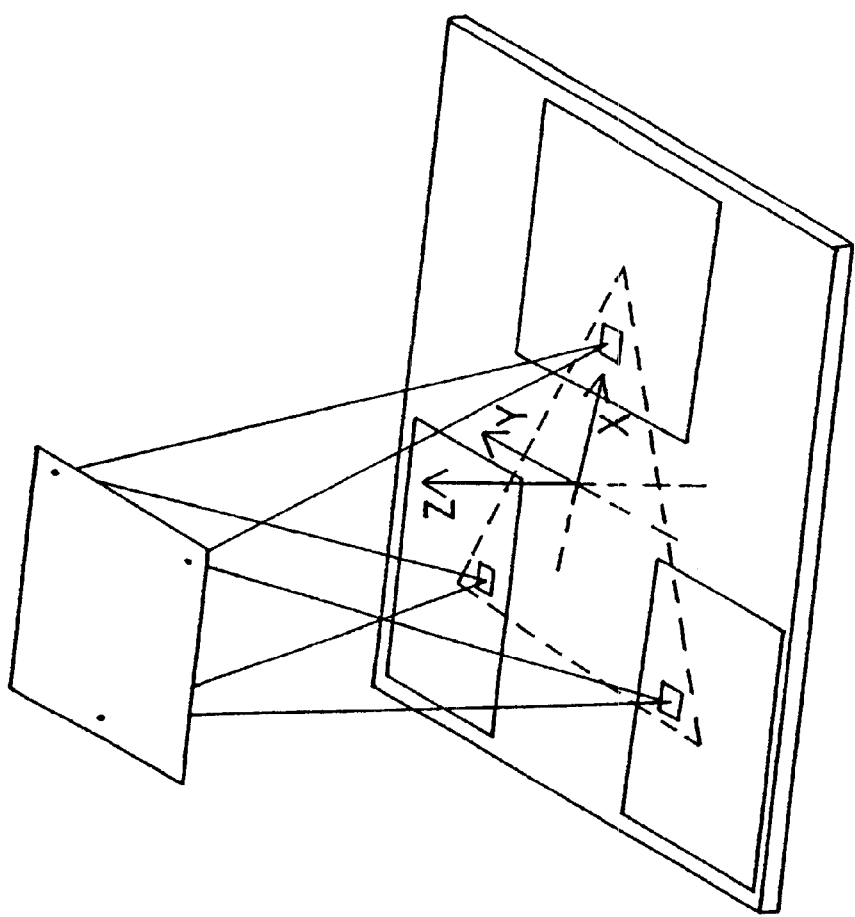

FIG. 12D shows the six-degree of freedom micro-positioner moved in pure translation along the Z-axis. Unlabeled components are identical to those in FIG. 12A. Each of the three two-degree of freedom micro-positioners are moved in pure translation along an imaginary line extending from the respective point of the reference triangle to the center of the reference triangle. The moving platform moves in pure translation in the direction of the Z-axis as a result of movement of each of the two-degree of freedom micro-positioners. As shown, each of the three two-degree of freedom micro-positioners is the same distance from their respective point on the reference triangle and along their respective imaginary line.

Figure 12E:
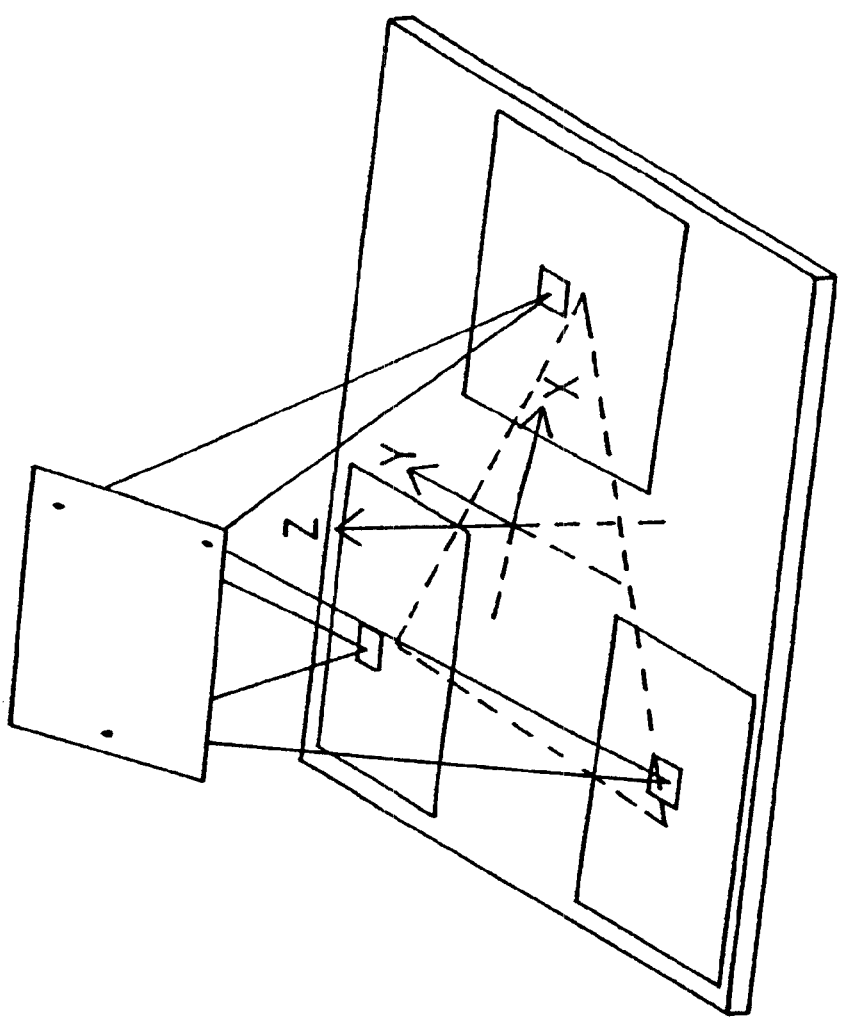

FIG. 12E shows the six-degree of freedom micro-positioner moved in rotation about the Z-axis. Unlabeled components are identical to those in FIG. 12A. The moving platform rotates about the Z-axis as a result of movement of each of the two-degree of freedom micro-positioners. As shown in FIG. 12E, each of the centers of the three two-degree of freedom micro-positioners are the same distance from their respective point on the reference triangle and together rotated in a counter clockwise direction.

Figure 12F:
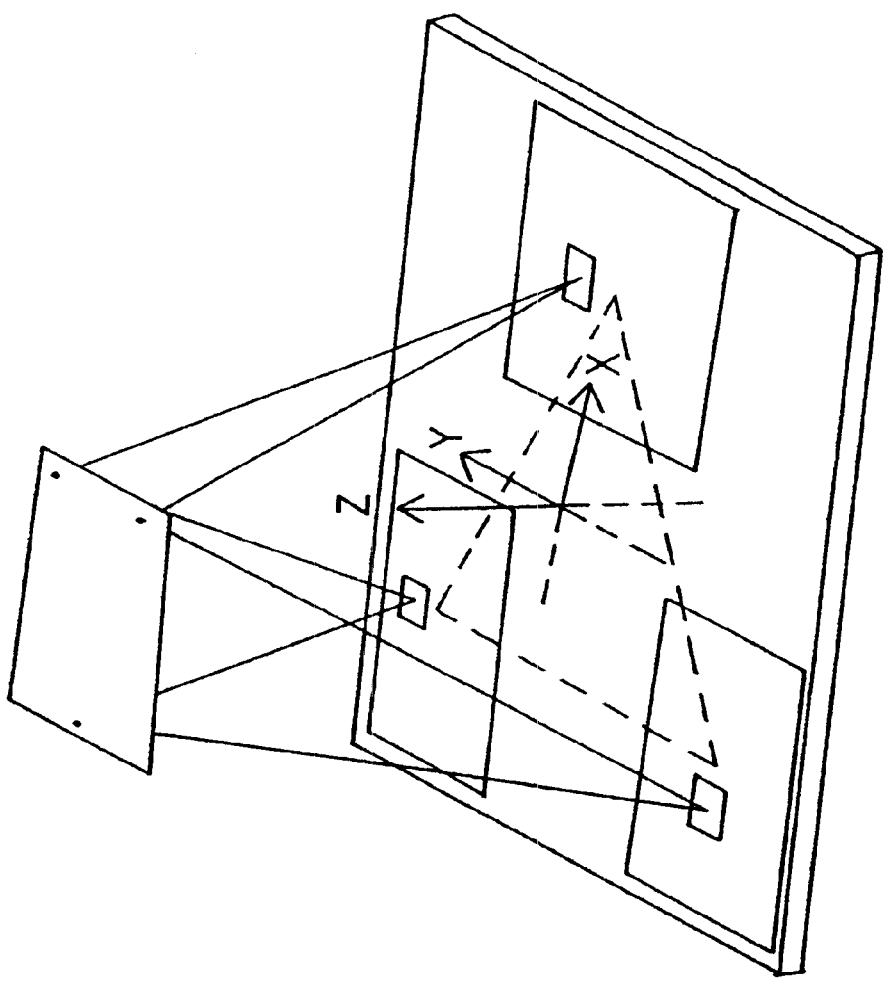
Figure 12G:
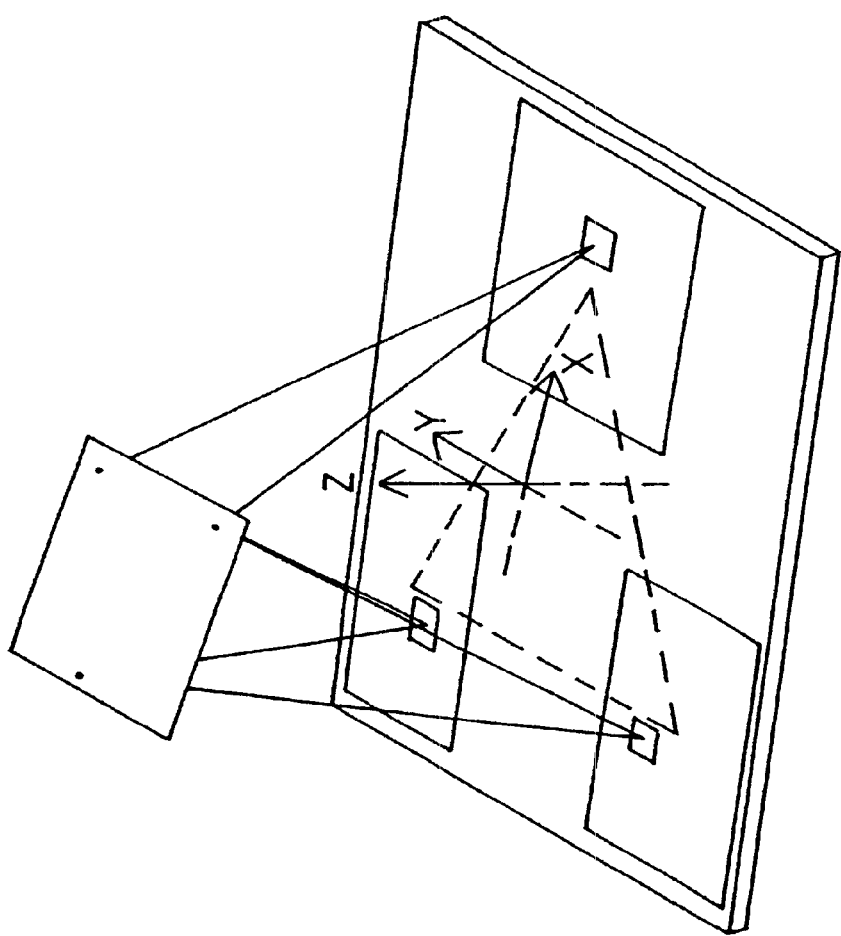
Figure 12H:
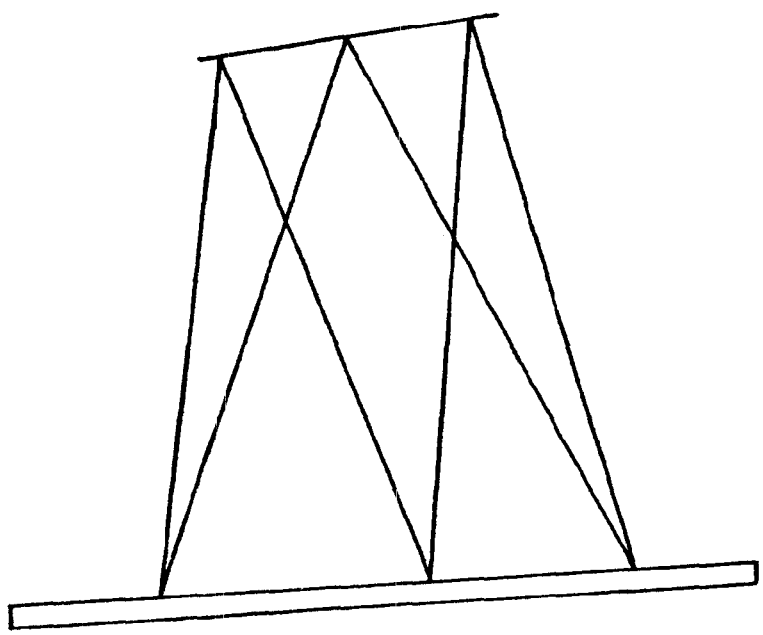

FIGS. 12F and 12H show the six-degree of freedom micro-positioner moved in rotation about the X-axis located on the moving platform. Unlabeled components are identical to those in FIG. 12A. The moving platform rotates about the X-axis as a result of movement of each of the two-degree of freedom micro-positioners. FIG. 12H shows a side view of the six-degree of freedom micro-positioner rotated about the X-axis.

Figure 12I:
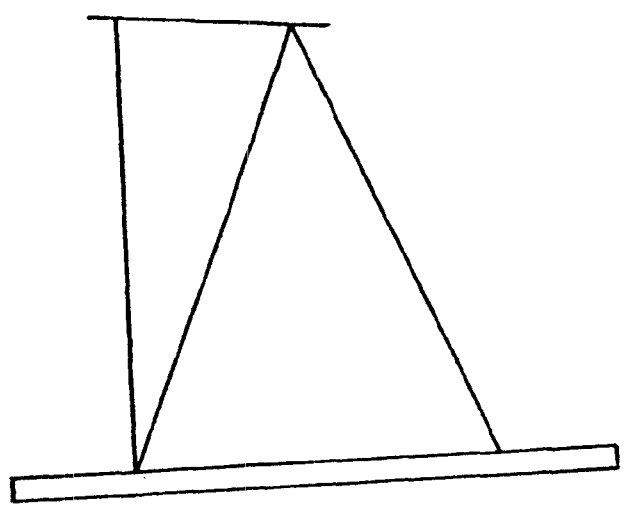

FIGS. 12G and 12I show the six-degree of freedom micro-positioner moved in rotation about the Y-axis located on the moving platform. Unlabeled components are identical to those in FIG. 12A. The moving platform rotates about the Y-axis as a result of movement of each of the two-degree of freedom micro-positioners. FIG. 12H shows a side view of the six-degree of freedom micro-positioner rotated about the Y-axis.

Figure 13:
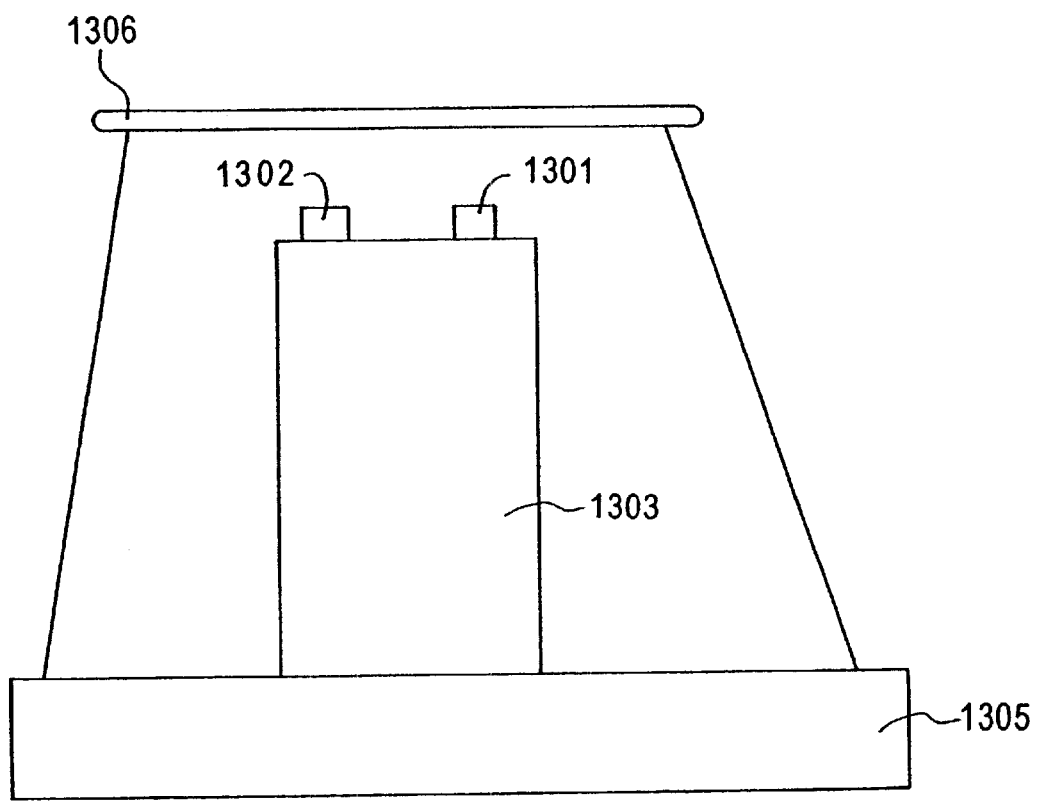
FIG. 13 shows a side view of a six-degree of freedom deformable structure micro-positioner of FIG. 12.

FIG. 13 shows a side view of another aspect of the six-degree of freedom micro-positioner. Extending from the base plate 1305 up toward and underneath the moving platform 1306 is extension 1303. On top of the extension at least one sensor 1301 may be placed. The sensor may monitor, among other characteristics of the six-degree of freedom micro-positioner, translation and rotation of the moving platform. Each sensor may communicate with controller 1215.

The extension also may have at least one extrusion 1302 to limit displacement of the moving platform. The extrusion or extrusions can prevent the moving plate from tilting beyond a predetermined angle.

It will also be recognized by those skilled in the art that, while the invention has been described above in terms of one or more preferred embodiments, it is not limited thereto. Various features and aspects of the above described invention may be used individually or jointly. Further, although the invention has been described in the context of its implementation in a particular environment and for particular purposes, e.g. micro-positioning, those skilled in the art will recognize that its usefulness is not limited thereto and that the present invention can be beneficially utilized in any number of environments and implementations. Accordingly, the claims set forth below should be construed in view of the full breath and spirit of the invention as disclosed herein.

We claim:

1. A positioning device, comprising:
   a movable platform;
   a plurality of struts attached to the movable platform; and
   a monolithic base having multiple integral positioning stages supporting each of the plurality of struts, and configured to move the plurality of struts to thereby move the movable platform.

2. The positioning device of claim 1, further comprising:
   a plurality of flexures configured to attach each of the plurality of struts to the movable platform and the monolithic base.

3. The positioning device of claim 1, wherein the plurality of struts is six struts.

4. The positioning device of claim 3, wherein the six struts are symmetrically attached about the movable platform.

5. The positioning device of claim 1, further comprising:
   at least one sensor configured to sense movement of the movable platform.

6. The positioning device of claim 1, further comprising:
   a stop member configured to limit movement of the movable platform.

7. The positioning device of claim 1, wherein the positioning device is a micro-positioning device.

8. The positioning device of claim 1, wherein the monolithic base includes:
   a first positioning stage;
   a second positioning stage; and
   a third positioning stage;
   wherein a respective portion of the plurality of struts is attached to each of the first, the second and the third positioning stages.

9. The positioning device of claim 8, wherein each of the first, the second and the third positioning stages is configured to move in two orthogonal directions.

10. The positioning device of claim 8, wherein each of the first, the second and the third positioning stages is configured to move independent of the other positioning stages.

11. The positioning device of claim 8, wherein:
    the respective portion of the plurality of struts attached to each of the first, the second and the third positioning stages moves as a result of movement of the positioning stage to which that portion is attached.

12. The positioning device of claim 8, wherein each of the first, the second and the third positioning stages are formed by machining the monolithic base.

13. The positioning device of claim 8, wherein the movable platform moves as a result of movement of at least one of the first, the second and the third positioning stages.

14. The positioning device of claim 8, wherein:
    the respective portion of the plurality of struts attached to each of the first, the second and the third positioning stages is attached to the center of each of the first, the second and the third positioning stages.

15. The positioning device of claim 1, wherein:
    the monolithic base includes a plurality of integral positioning stages; and
    the plurality of integral positioning stages are configured to support each of the plurality of struts and to move each of the plurality of struts to thereby move the movable platform.

16. The positioning device of claim 15, wherein the monolithic base is planar.

17. The positioning device of claim 1, wherein the monolithic base is further configured for movement with six-degrees of freedom.

* * * * *